(12) United States Patent
Carmenaty

(10) Patent No.: US 11,447,078 B2
(45) Date of Patent: Sep. 20, 2022

(54) LIFTGATE WITH INTEGRATED REARVIEW VISIBILITY

(71) Applicant: MAXON INDUSTRIES, INC., Santa Fe Springs, CA (US)

(72) Inventor: Michael Carmenaty, South Gate, CA (US)

(73) Assignee: MAXON INDUSTRIES, INC., Santa Fe Springs, CA (US)

( * ) Notice: Subject to any disclaimer, the term of this patent is extended or adjusted under 35 U.S.C. 154(b) by 372 days.

(21) Appl. No.: 16/616,851

(22) PCT Filed: Jun. 4, 2018

(86) PCT No.: PCT/US2018/035911
§ 371 (c)(1),
(2) Date: Nov. 25, 2019

(87) PCT Pub. No.: WO2018/226605
PCT Pub. Date: Dec. 13, 2018

(65) Prior Publication Data
US 2021/0170959 A1 Jun. 10, 2021

Related U.S. Application Data

(60) Provisional application No. 62/515,413, filed on Jun. 5, 2017.

(51) Int. Cl.
*B60R 11/04* (2006.01)
*B60J 5/10* (2006.01)
*B60R 11/00* (2006.01)

(52) U.S. Cl.
CPC ............. *B60R 11/04* (2013.01); *B60J 5/107* (2013.01); *B60R 2011/004* (2013.01)

(58) Field of Classification Search
CPC ..... B60R 11/04; B60R 2011/004; B60J 5/107
See application file for complete search history.

(56) References Cited

U.S. PATENT DOCUMENTS 9,669,771 B1  6/2017  Helm
2004/0119881 A1*  6/2004  Matko ............... B60R 11/04
                                                                   348/375

(Continued)

FOREIGN PATENT DOCUMENTS

DE      102006008718 A1    8/2007

OTHER PUBLICATIONS

International Search Report and Written Opinion for PCT/US18/35911 dated Oct. 22, 2018.

*Primary Examiner* — Sath V Perungavoor
*Assistant Examiner* — Tyler B Edwards
(74) *Attorney, Agent, or Firm* — Concept IP LLP; Michael Zarrabian

(57) ABSTRACT

A disclosed system includes a liftgate housing; a tab of the liftgate housing moveable to an acute angle relative to a first portion of the liftgate housing; a tab aperture disposed in the tab; a first wall and a second wall attached to the liftgate housing, where the first wall, the second wall, and the tab form a barrier to prevent debris from entering into the housing; a camera, where at least a portion of the camera is disposed through the tab aperture, and where movement of the tab relative to the first portion of the liftgate housing adjusts the field of view of the camera.

16 Claims, 24 Drawing Sheets

(56) References Cited

U.S. PATENT DOCUMENTS

| | | | |
|---|---|---|---|
| 2009/0040300 A1* | 2/2009 | Scribner | ................... B60R 1/00 348/148 |
| 2017/0050551 A1* | 2/2017 | Smith | ....................... B23P 6/00 |
| 2017/0057421 A1 | 3/2017 | Takehara | |

* cited by examiner

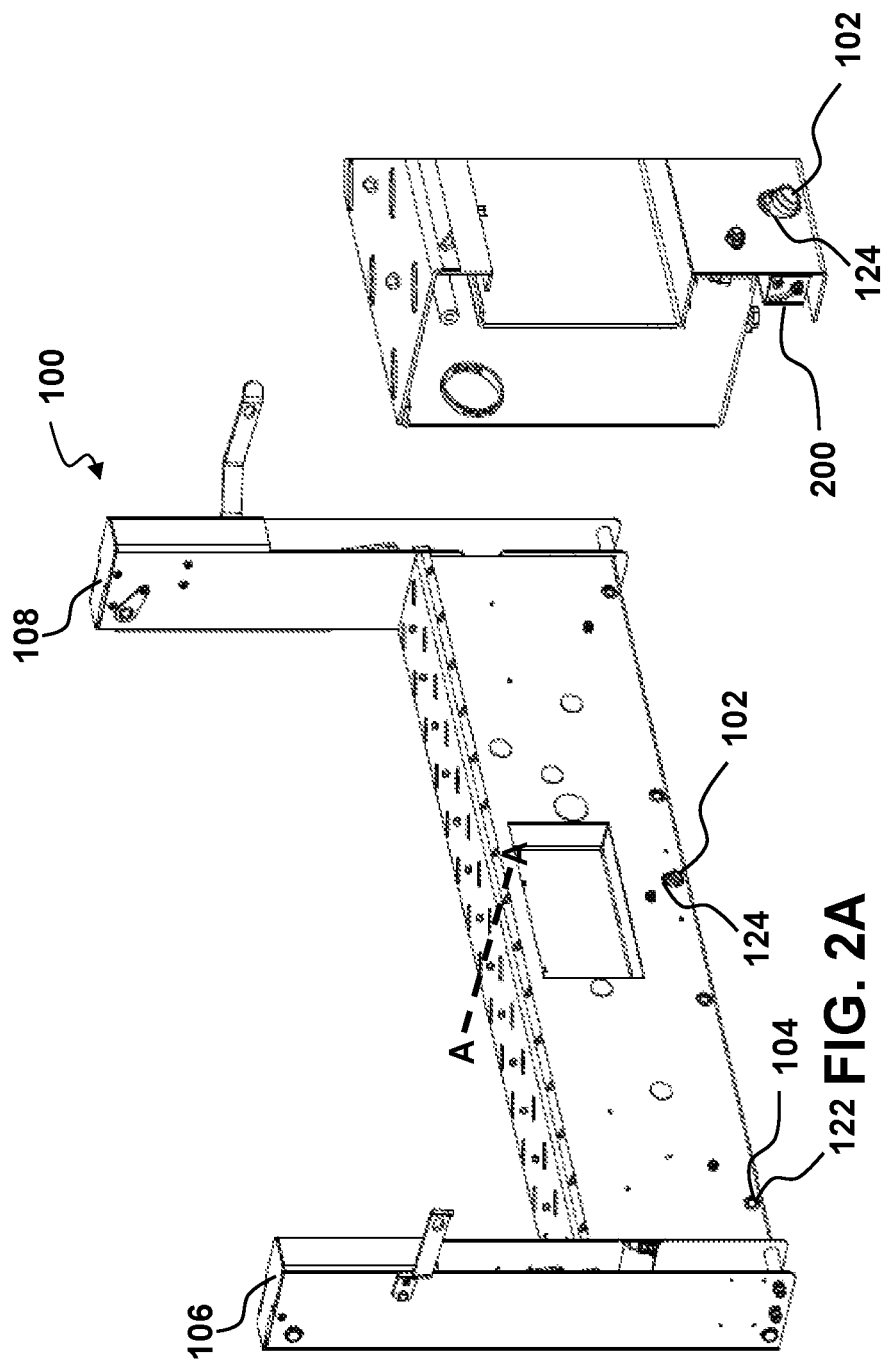

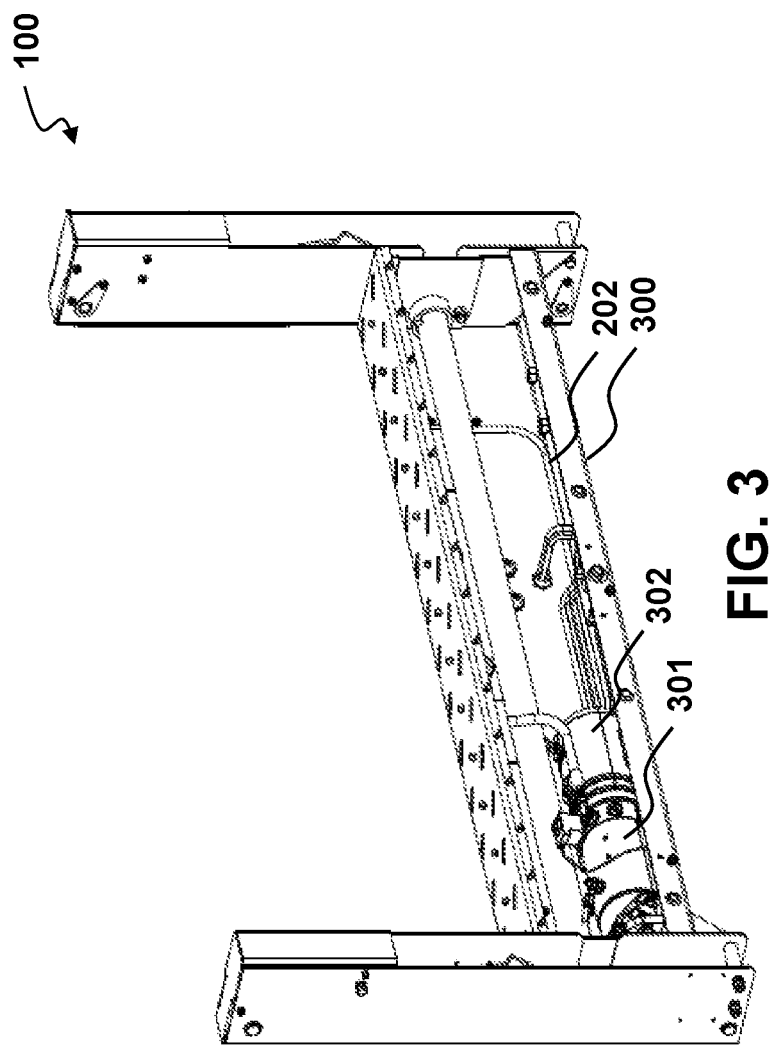

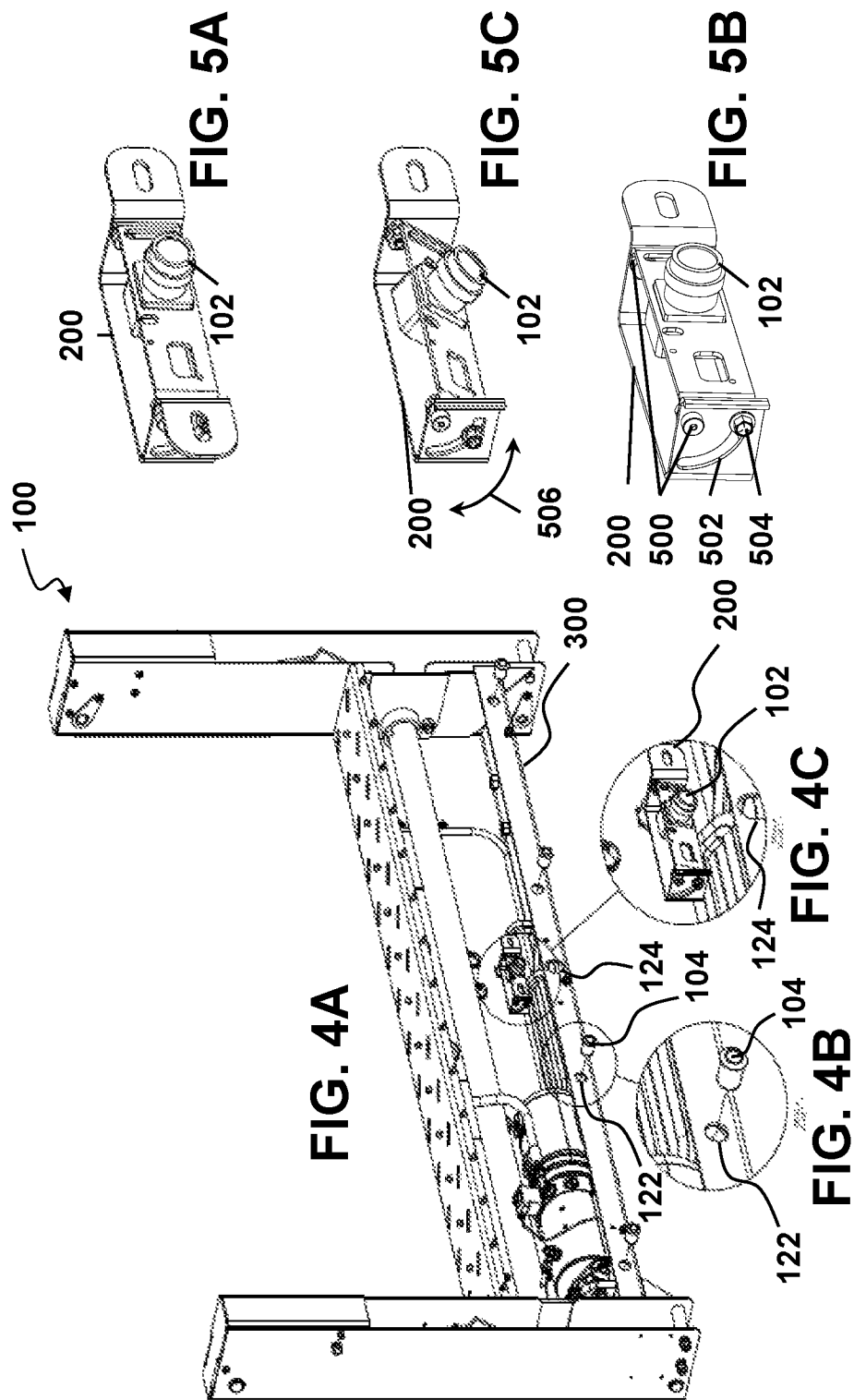

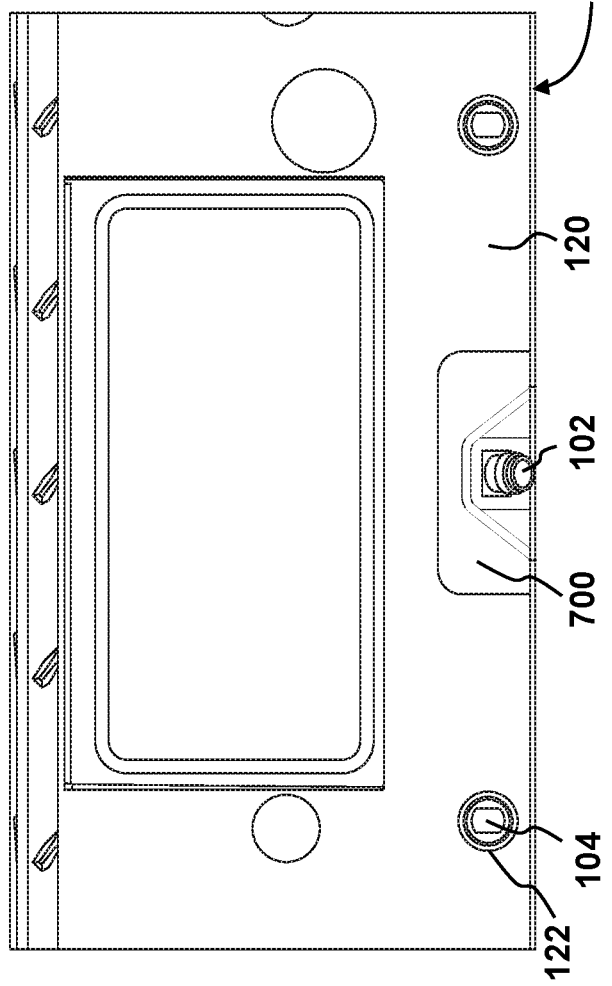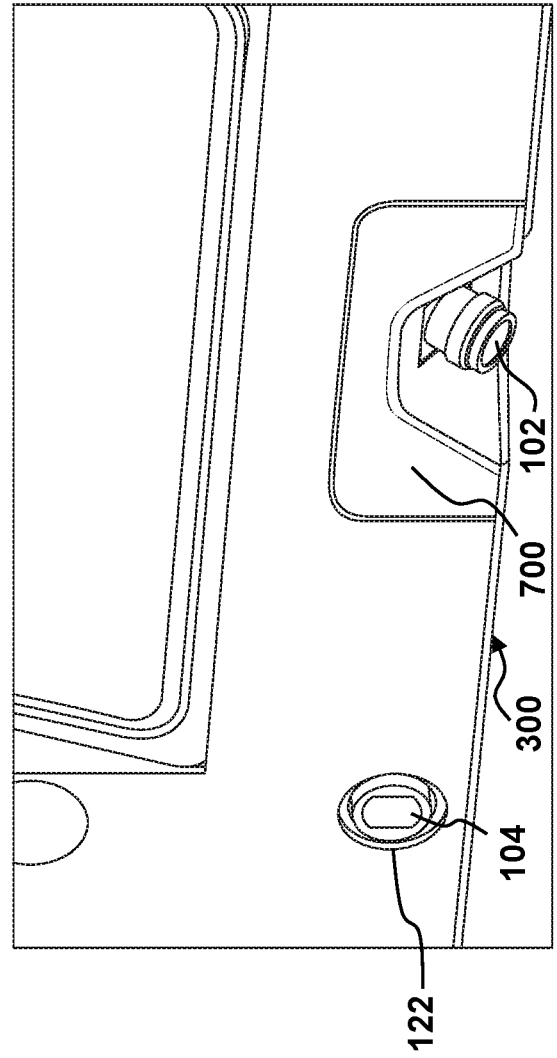

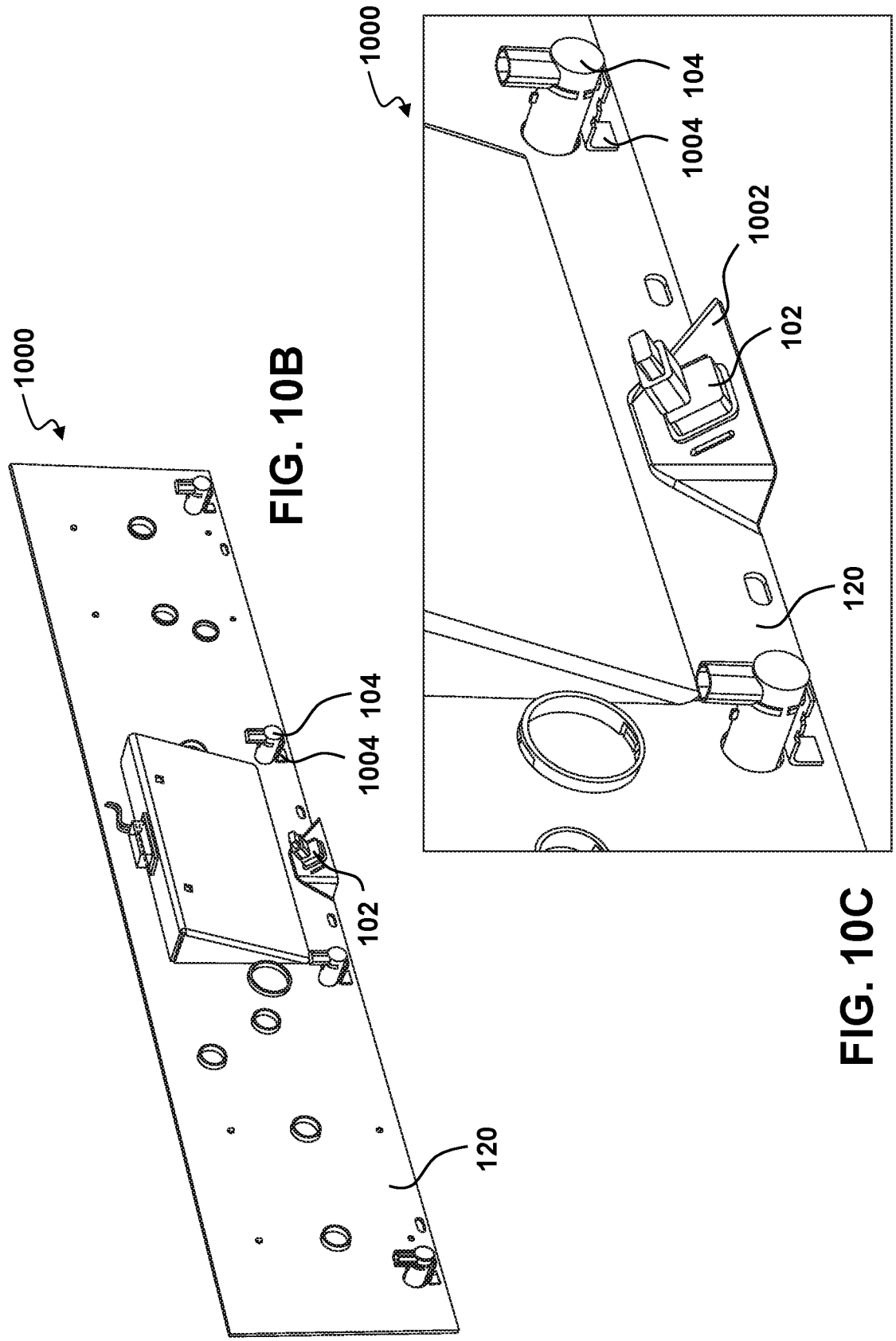

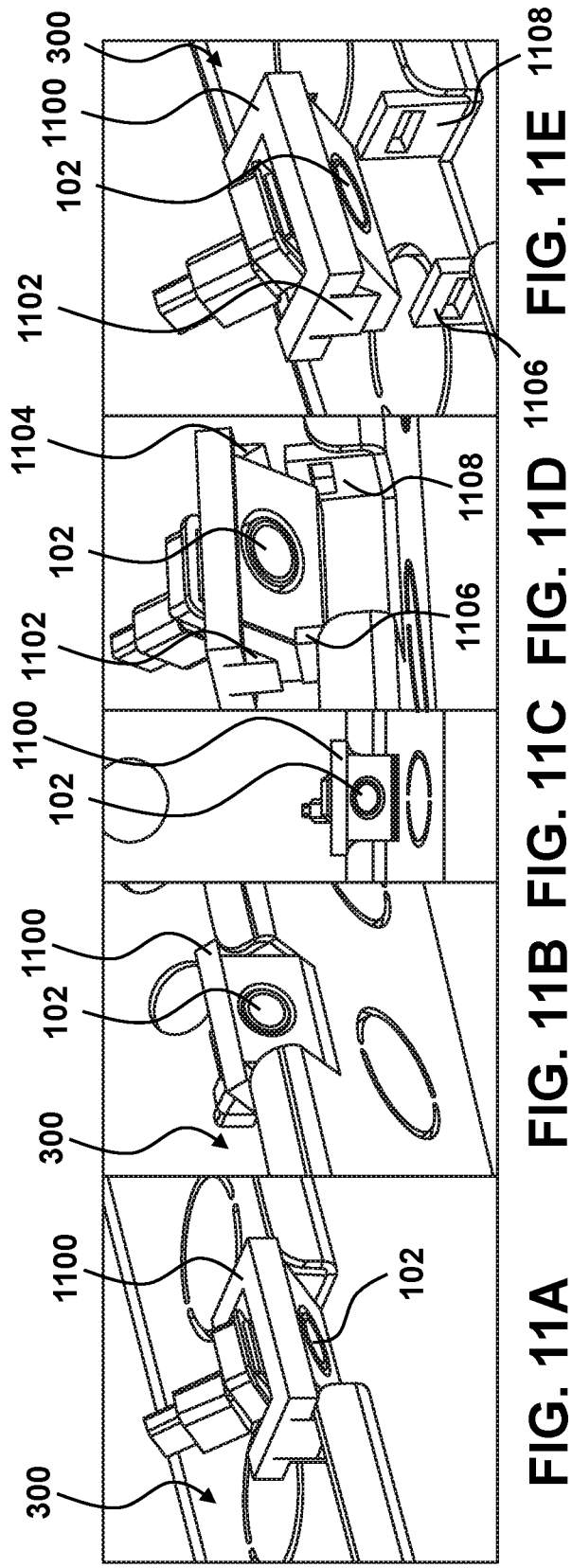

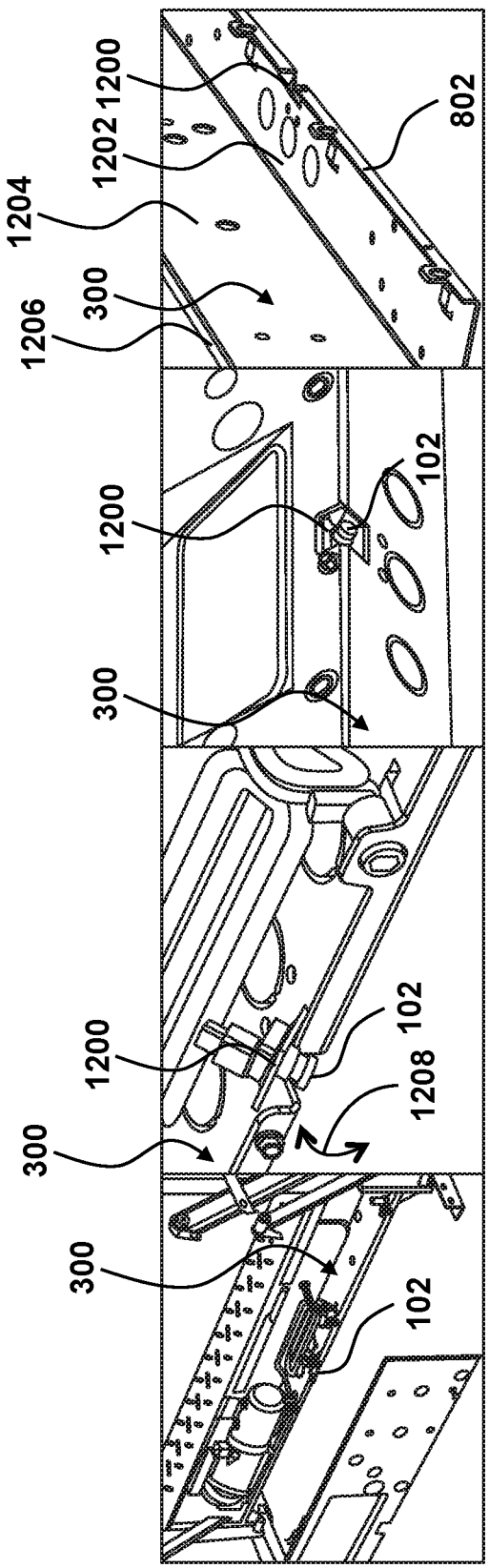

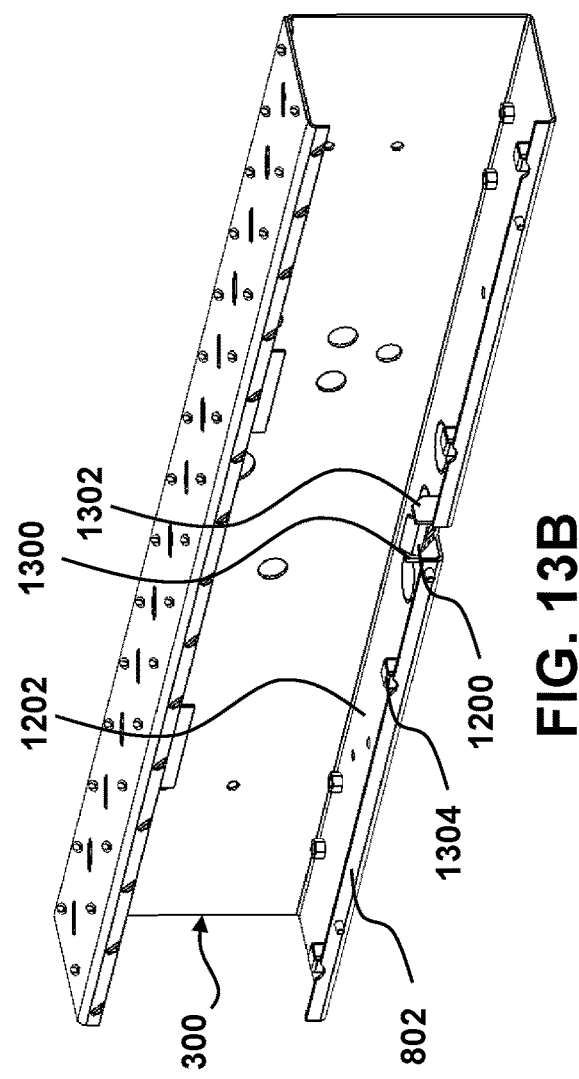
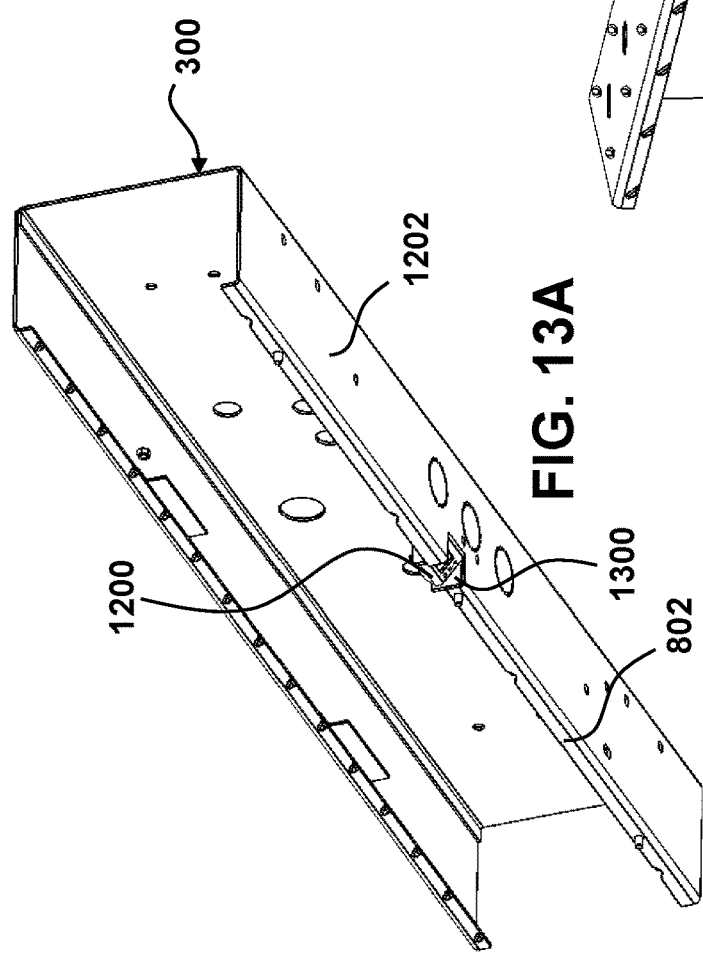

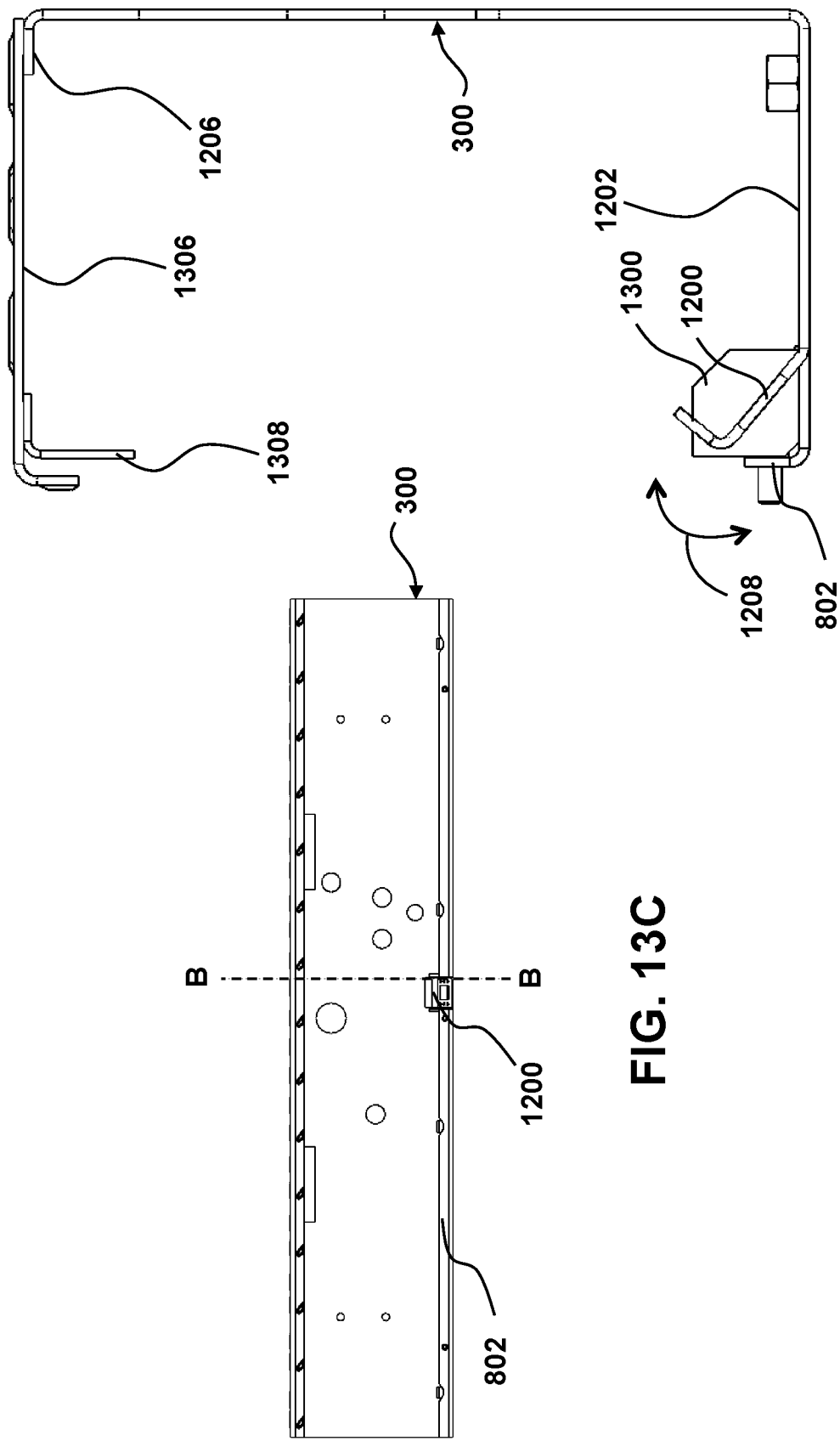

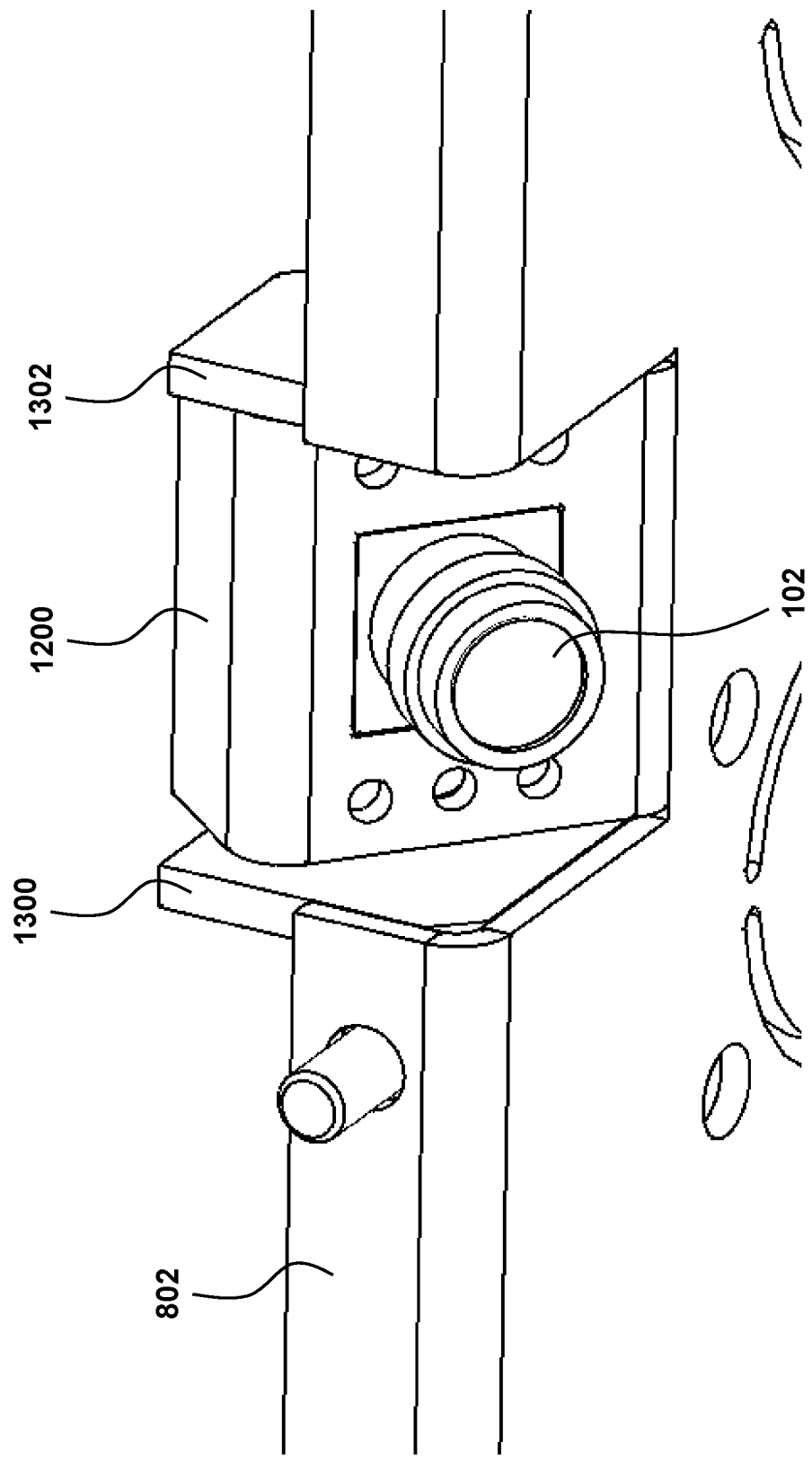

LIFTGATE WITH INTEGRATED REARVIEW VISIBILITY

CROSS-REFERENCE TO RELATED APPLICATIONS

This application is a 35 U.S.C. § 371 National Stage Entry of International Application No. PCT/US2018/035911 filed Jun. 4, 2018, which claims the priority benefit of U.S. Provisional Patent Application Ser. No. 62/515,413 filed Jun. 5, 2017, all of which are incorporated herein by reference in their entirety

FIELD OF ENDEAVOR

The invention relates to vehicle rearview visibility, and more particularly to rearview visibility for vehicles with liftgates.

BACKGROUND

Installing a liftgate in a vehicle may require the removal of a tailgate and/or bumper from the vehicle. An original equipment manufacturer (OEM) backup camera and/or proximity sensor may be installed in the tailgate and/or bumper. The use of the backup camera and/or proximity sensor may be needed or desired by a user of the vehicle.

SUMMARY

In one embodiment, an apparatus disclosed herein comprises: a liftgate housing; a tab of the liftgate housing, where the tab is moveable to an acute angle relative to a first portion of the liftgate housing; a tab aperture disposed in the tab; a first wall and a second wall attached to the liftgate housing, where the first wall and the second wall are substantially perpendicular to the first portion of the liftgate housing, where the first wall, the second wall, and the tab form a barrier to prevent debris from entering into the housing; a camera, where at least a portion of the camera is disposed through the tab aperture, and where movement of the tab relative to the first portion of the liftgate housing adjusts the field of view of the camera; one or more proximity sensor mounts attached to the housing; one or more proximity sensors, where the one or more proximity sensors are attached to the one or more proximity sensor mounts; and one or more proximity sensor connectors, where the one or more proximity sensor connectors are disposed about an outer diameter of the proximity sensor and through an opening in the proximity sensor mount created between the proximity sensor mount and the first portion of the housing.

In another embodiment, a system disclosed herein comprises: a liftgate housing comprising a lip portion, where the lip portion comprises one or more apertures; a cover attached to the liftgate housing; a camera mount comprising a camera mount aperture to receive at least a portion of a camera; an upper guide attached to the camera mount, where the upper guide at least partially surrounds a portion of the camera body; a lower guide attached to the camera mount, wherein the lower guide at least partially surrounds a portion of the camera body; a plate connected to the lower guide, where the plate secures the camera to the camera mount; a first channel configured to fit into one or more of: the lip portion of the liftgate housing and the cover; a second channel configured to fit into one or more of: the lip portion of the liftgate housing and the cover; one or more proximity sensor mounts attached to the housing proximate the one or more apertures in the lip portion of the housing; and one or more proximity sensors attached to the one or more proximity sensor such that an end of the proximity sensor is aligned with the aperture in the lip portion of the housing.

In another embodiment, a system disclosed herein comprises: a cover comprising one or more apertures and an integral camera mount; a camera mount aperture disposed in the integral camera mount to receive at least a portion of a camera; one or more proximity sensor mounts attached to the cover proximate the one or more apertures; and one or more proximity sensors attached to the one or more proximity sensor mounts such that an end of the proximity sensor is aligned with the aperture in the cover.

These and other features, aspects and advantages of the present invention will become understood with reference to the following description, appended claims and accompanying figures.

BRIEF DESCRIPTION OF THE DRAWINGS

Embodiments are illustrated by way of example and not limitation in the figures of the accompanying drawings, which may not be drawn to scale, and in which:

FIG. 2A depicts a perspective view of the liftgate of FIG. 1 with the platform removed;

FIG. 2B depicts a cross-sectional view of the liftgate of FIG. 2A about line A-A;

FIG. 3 depicts a perspective view of another liftgate embodiment with a cover removed;

FIG. 4A depicts a partially exploded perspective view of the liftgate of FIG. 3 with the camera, camera bracket, and proximity sensors separated from the housing;

FIG. 4B depicts a close-up view of the proximity sensor and aperture about B in FIG. 4A;

FIG. 4C depicts a close-up view of the camera, camera bracket, and aperture about C in FIG. 4A;

FIG. 5A depicts a perspective view of a camera and camera bracket in a first position;

FIG. 5B depicts a partial cut-away view of the camera and bracket of FIG. 5A in the first position;

FIG. 5C depicts the camera and bracket of FIG. 5B in a second position;

FIGS. 9A-9C depict front, front close-up, and perspective close-up views, respectively, of the camera and camera mount of FIG. 8 and proximity sensors installed in a housing of a liftgate embodiment;

FIGS. 10A-10C depict front perspective, rear perspective, and rear perspective close-up views, respectively, of a camera installed in an integral camera mount of a cover and proximity sensors installed on sensor mounts of a liftgate embodiment;

FIGS. 11A-11E depict a detachably attached camera housing and camera housing connector of a liftgate embodiment;

FIGS. 12A-12D depict a camera installed in a tab of a housing of a liftgate embodiment;

FIGS. 13A-13D depict bottom perspective, top perspective, front, and cross-section views, respectively, of an angled tab of a housing of a liftgate embodiment;

FIG. 14F depicts a close-up bottom perspective view of the liftgate embodiment of FIG. 13A with the camera installed in the housing;

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

In one embodiment, a system is disclosed herein that includes a liftgate having a cover. The cover includes a plurality of apertures that may fit a camera and/or proximity sensor to provide rearview visibility to a user of a vehicle. The camera may be mounted in a camera bracket proximate to an aperture and allow the user to adjust an angle of the camera looking through the aperture relative to the liftgate. The proximity sensors may be mounted in proximity sensor brackets to secure the proximity sensors through their respective apertures. The camera and/or proximity sensor may be original equipment manufacturer (OEM) devices moved from existing locations. For example, mounting a liftgate on a truck may require removing a bumper, which may contain proximity sensors, and removing a tailgate, which may contain the camera. By providing brackets and apertures for mounting these OEM devices, these OEM devices may continue to provide rearview visibility to a user of a vehicle without the need for additional devices or modifications to the vehicle.

Figure 1:
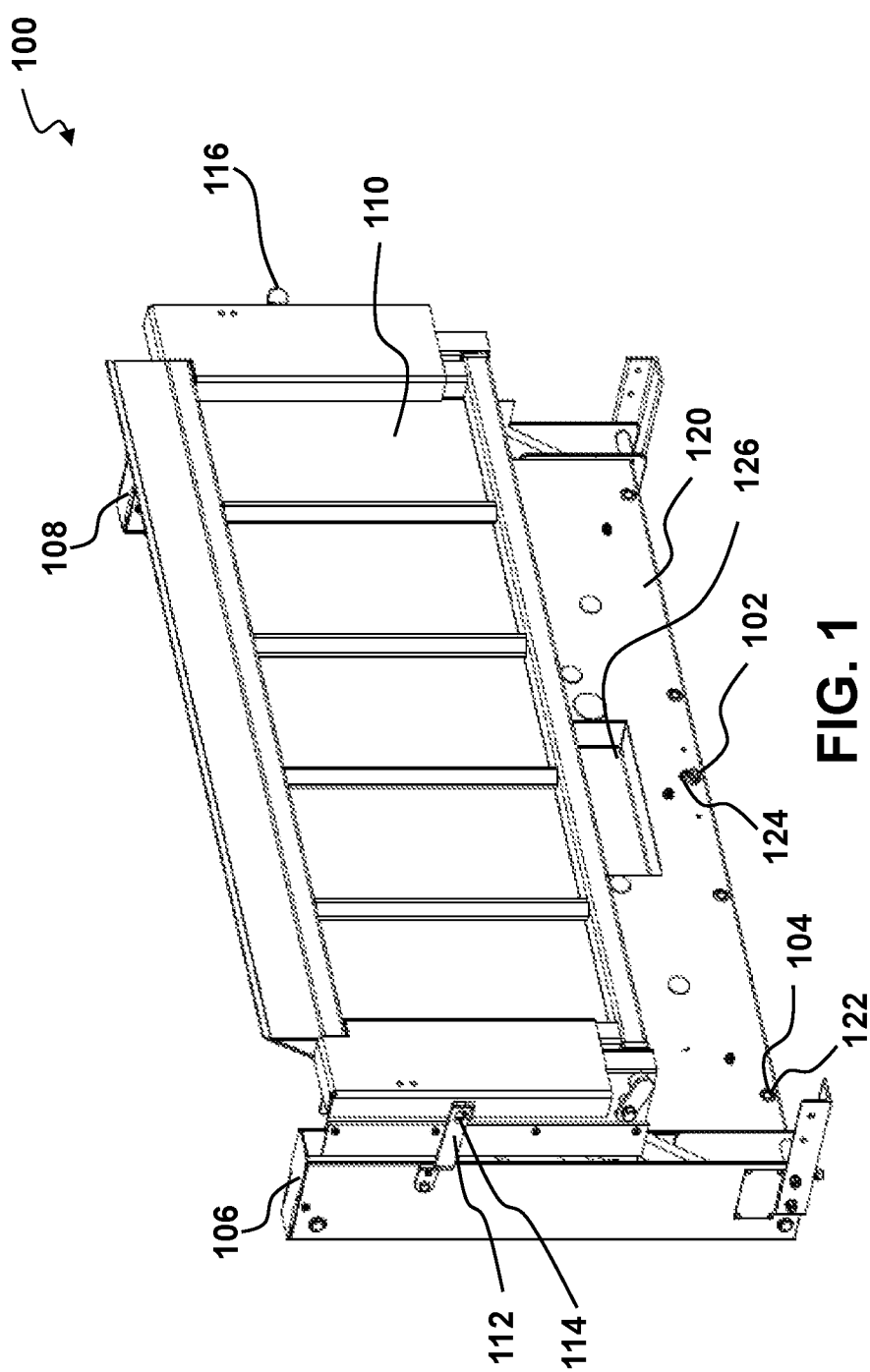
FIG. 1 depicts a perspective view of a liftgate embodiment having a camera and a plurality of proximity sensors.

FIG. 1 depicts a perspective view of a liftgate 100 having a camera 102 and a plurality of proximity sensors 104, according to one embodiment, the liftgate 100 may be mounted on a truck after a bumper and a tailgate of the truck are removed. The liftgate 100 includes a left upright 106 and a right upright 108, which are mounted to the truck. A platform 110 is secured in a stored position by a left latch 112 and latch pin 114 and a right latch 116 and latch pin (not shown). Controls (not shown) may be located on the side of the liftgate 100 and are used to control the liftgate 100 and lower or raise the platform 110 relative to the uprights 106, 108. A cover 120 protects a power unit, tank, power cable, and hydraulic tubing used to raise or lower the platform 110.

The cover 120 includes a plurality of apertures 122, 124, according to one embodiment. The aperture 122 proximate the proximity sensor 104 may have a circular shape to receive the proximity sensor 104. The aperture 124 proximate the camera 102 may have an oval shape to allow the camera 102 to view through the aperture 124 in a variety of orientations, e.g., to adjust the angle of the camera 102 relative to the liftgate 100 based on the height of the liftgate on the truck, the desired rearview visibility, etc. The cover 120 may also include a license plate bracket 126 for securing a license plate of the vehicle.

FIG. 2A depicts a perspective view of the liftgate 100 of FIG. 1 with the platform removed, according to one embodiment. Uprights 106, 108 are attached to the vehicle in place of the bumper and tailgate. The camera 102 has a view through aperture 124. The proximity sensor 104 is fit through aperture 122. While four proximity sensors and one camera are depicted in this embodiment, any number of proximity sensors and cameras may be used.

FIG. 2B depicts a cross-sectional view of the liftgate of FIG. 2A about line A-A. The camera 102 is mounted in a camera bracket 200, according to one embodiment. The camera bracket 200 may be used to adjust the angle of the camera 102 viewing through the aperture 124 relative to the liftgate.

FIG. 3 depicts a perspective view of another liftgate embodiment 100 with a cover removed. A power unit 301 including a pump and motor are disposed in a housing 300, according to one embodiment. A tank 302 and power cable 202 are also disposed on the housing 300 and placed behind the cover.

FIG. 4A depicts a partially exploded perspective view of the liftgate 100 of FIG. 3 with the camera 102, camera bracket 200, and proximity sensors 104 separated from the housing 300, according to one embodiment. FIG. 4B depicts a close-up view of the proximity sensor 104 and aperture 122 about B in FIG. 4A. FIG. 4C depicts a close-up view of the camera 102, camera bracket 200, and aperture 124 about C in FIG. 4A.

FIG. 5A depicts a perspective view of a camera 102 and camera bracket 200 in a first position, according to one embodiment. FIG. 5B depicts a partial cut-away view of the camera 102 and bracket 200 of FIG. 5A in the first position, according to one embodiment. FIG. 5C depicts the camera 102 and bracket 200 of FIG. 5B in a second position, according to one embodiment. The camera bracket 200 may include at least one pivot connector 500, a curved aperture 502, and an attachment 504. The attachment 504 may be disposed in the curved aperture and may be, for example, a nut and bolt. The camera 102 pivots 506 about the at least one pivot connector 500 relative to the camera bracket 200.

A pivot angle of the camera 102 may be secured via the attachment 504 in the curved aperture 502, according to one embodiment. The camera angle may be adjusted based on the height of the liftgate, the desired rearview visibility, etc. In some embodiments, the camera bracket 200 may include at least one pivot connector 500. The camera 102 may pivot about the at least one pivot connector 500 relative to the camera bracket 200. A pivot angle of the camera 102 may be secured via a tightening of the pivot connector 500.

Figure 6:
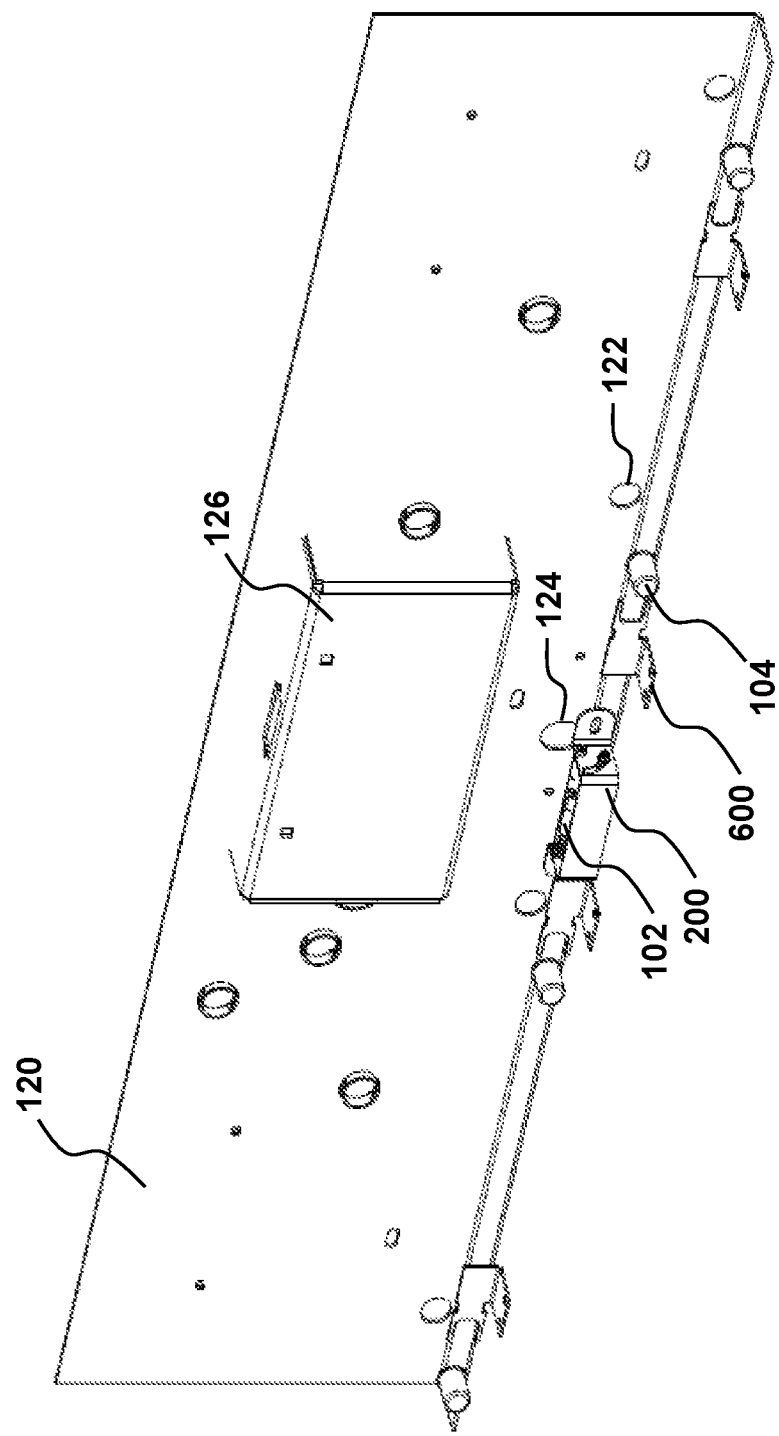
FIG. 6 depicts a partially exploded rear perspective view of a cover with the camera, camera bracket, proximity sensors, and proximity sensor brackets separated from the cover.

FIG. 6 depicts a partially exploded rear perspective view of a cover 120 with the camera 102, camera bracket 200, proximity sensors 104, and proximity sensor brackets 600 separated from the cover 120. The license plate bracket 126 may include a plurality of apertures for securing a license plate, according to one embodiment.

The proximity sensor brackets 600 may include a C-shaped opening for securing the proximity sensors 104 having a visibility through the apertures. While four proximity sensors 104 and one camera 102 are shown, any number of cameras and proximity sensors may be used. The cover 120 is shown as having apertures for the cameras and proximity sensors. In other embodiments, the apertures may be provided in an additional bracket and/or another portion of the liftgate as long as the desired rearview visibility is maintained.

Figure 7B:
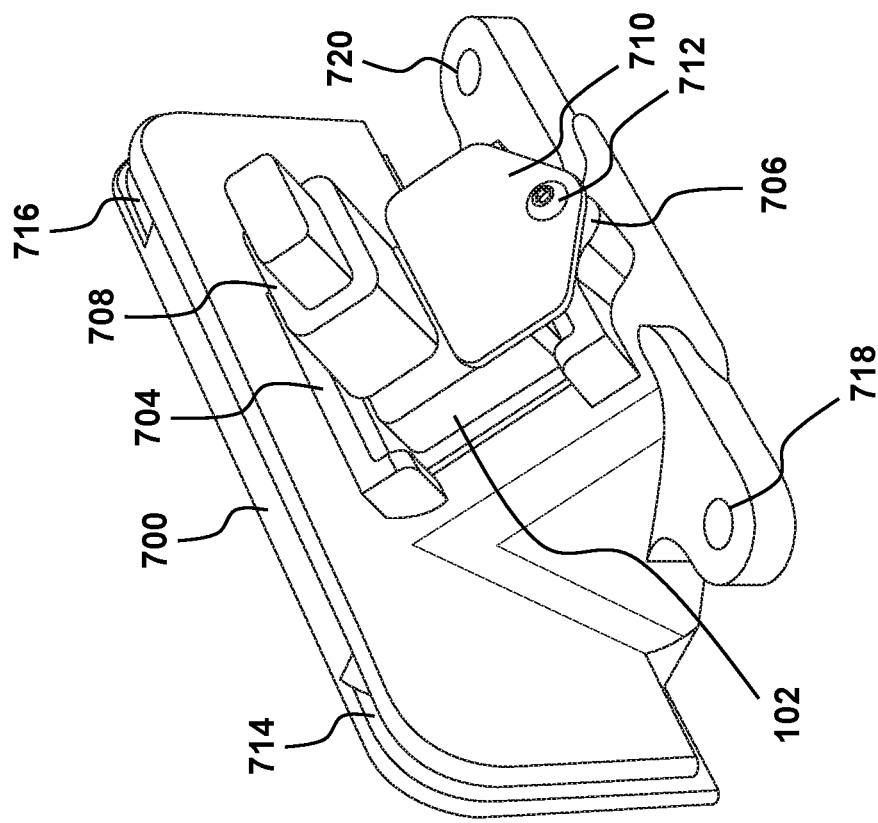
FIGS. 7A-7B depict front and rear perspective views of a camera and camera mount.
Figure 7A:
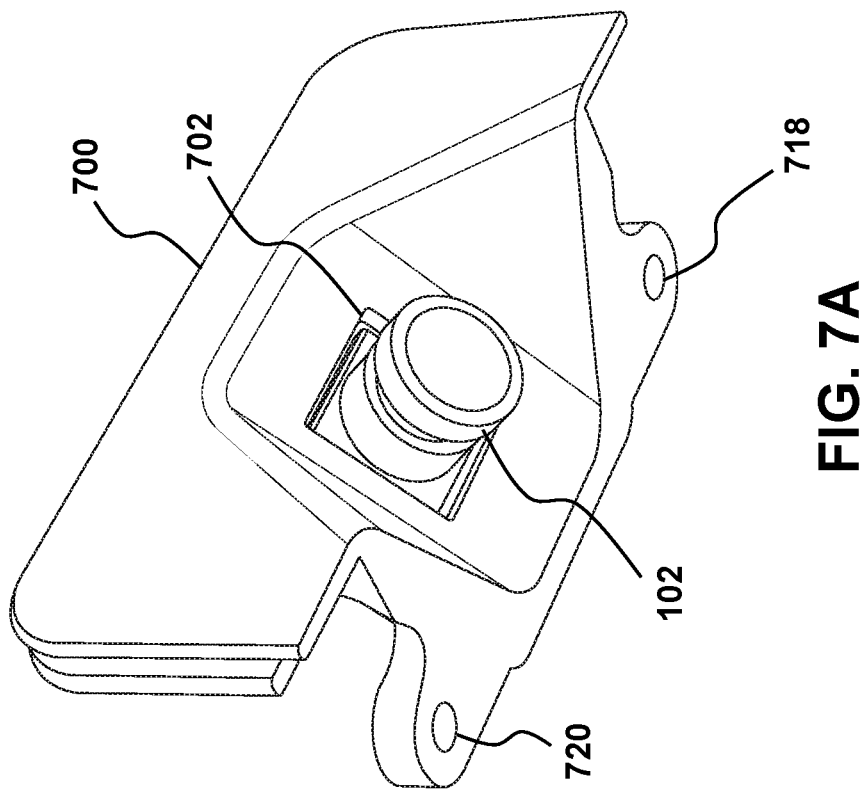

FIGS. 7A-7B depict front and rear perspective views of a camera 102 and camera mount 700, according to one embodiment. The camera mount 700 may include a camera mount aperture 702 to receive a portion of the camera 102. The camera mount 700 may also include an upper guide 704 and a lower guide 706 to at least partially surround a portion of the camera 102 body. A connector 708 may be fixedly or detachably attached to the camera 102 to provide power and transfer information, such as a video feed, from the camera 102.

A plate 710 may be attached to the lower guide 706 to keep the camera 102 in place in the camera mount 700, according to one embodiment. A fastener 712 may secure the plate 710 at a varying distance from the lower guide 706 so as to accommodate cameras 102 having varying depths. In some embodiments, the upper guide 704 and lower guide 706 may be adjustable to accommodate cameras 102 having varying dimensions. In other embodiments, the upper guide 704 and lower guide 706 may be fixed to accommodate a specific camera 102.

Figure 8:
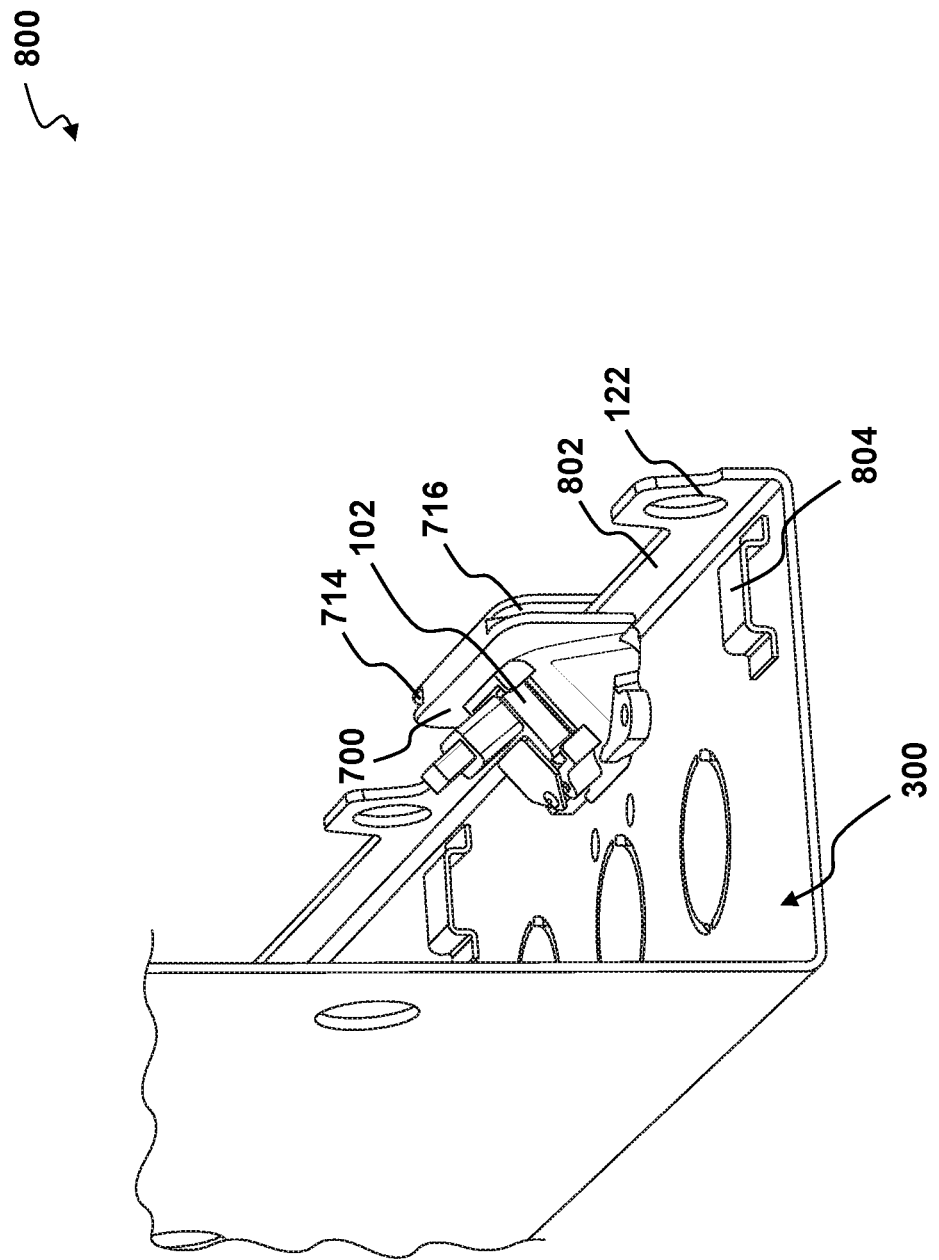
FIG. 8 depicts a perspective view of the camera and camera mount of FIG. 8 installed in a housing of a liftgate embodiment.
Figure 9A:
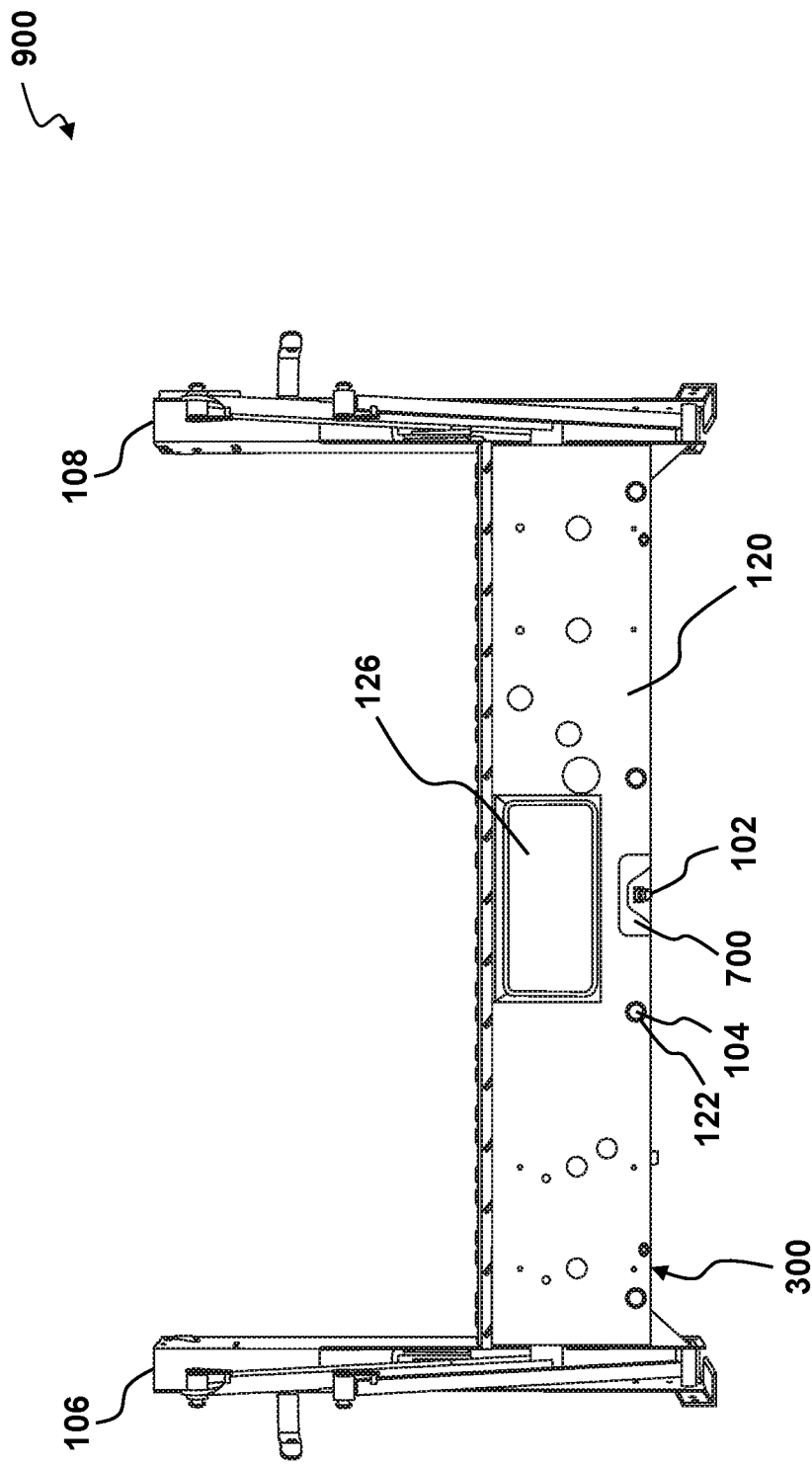

The camera mount 700 may include a first channel 714 and a second channel 716, according to one embodiment. The first channel 714 and the second channel 716 may be fit into a portion of a housing, such as shown in FIG. 8, according to one embodiment, and/or a portion of a cover, such as shown in FIGS. 9A-9C, according to another embodiment. The camera mount 700 may have a set width and height to fit into the portion of the housing and/or cover, while the dimensions of the camera mount aperture 702, the upper guide 704, and/or lower guide 706 may be varied to accommodate various camera models. The camera housing 700 may include one or more mounting apertures 718, 720, such as apertures to receive a screw, nut, or bolt. The one or more mounting apertures 718, 720 may be used to connect the camera housing 700 to the housing, such as shown in FIG. 8.

FIG. 8 depicts a perspective view of the camera 102 and camera mount 700 of FIG. 8 installed in a housing 300 of a liftgate 800, according to one embodiment. The first channel 714 and second channel 716 are fit into a lip portion 802 of the housing 300. A proximity sensor mount 804 may be attached to the housing 300 proximate an aperture 122 in the lip portion 802 of the housing 300. A proximity sensor may be attached to the proximity sensor mount 804 such that an end of the proximity sensor is aligned with the aperture 122, such as shown in FIGS. 9A-9C, according to one embodiment.

FIGS. 9A-9C depict front, front close-up, and perspective close-up views, respectively, of the camera 102 and camera mount 700 of FIG. 8 and proximity sensors 122 installed in a housing 300 of a liftgate 900, according to one embodiment. The liftgate 900 includes a cover 120 attached to the housing 300. The cover 120 includes apertures 122 for the proximity sensors 104. A portion of the cover 120 may fit about the first and second channels of the camera mount 700, as shown in FIGS. 7A-7B. The cover 120 may include a license plate bracket 126 for securing a license plate to the cover 120. The liftgate 900 may also include a left upright 106 and a right upright 108 attached to the housing 300, according to one embodiment.

Figure 10A:
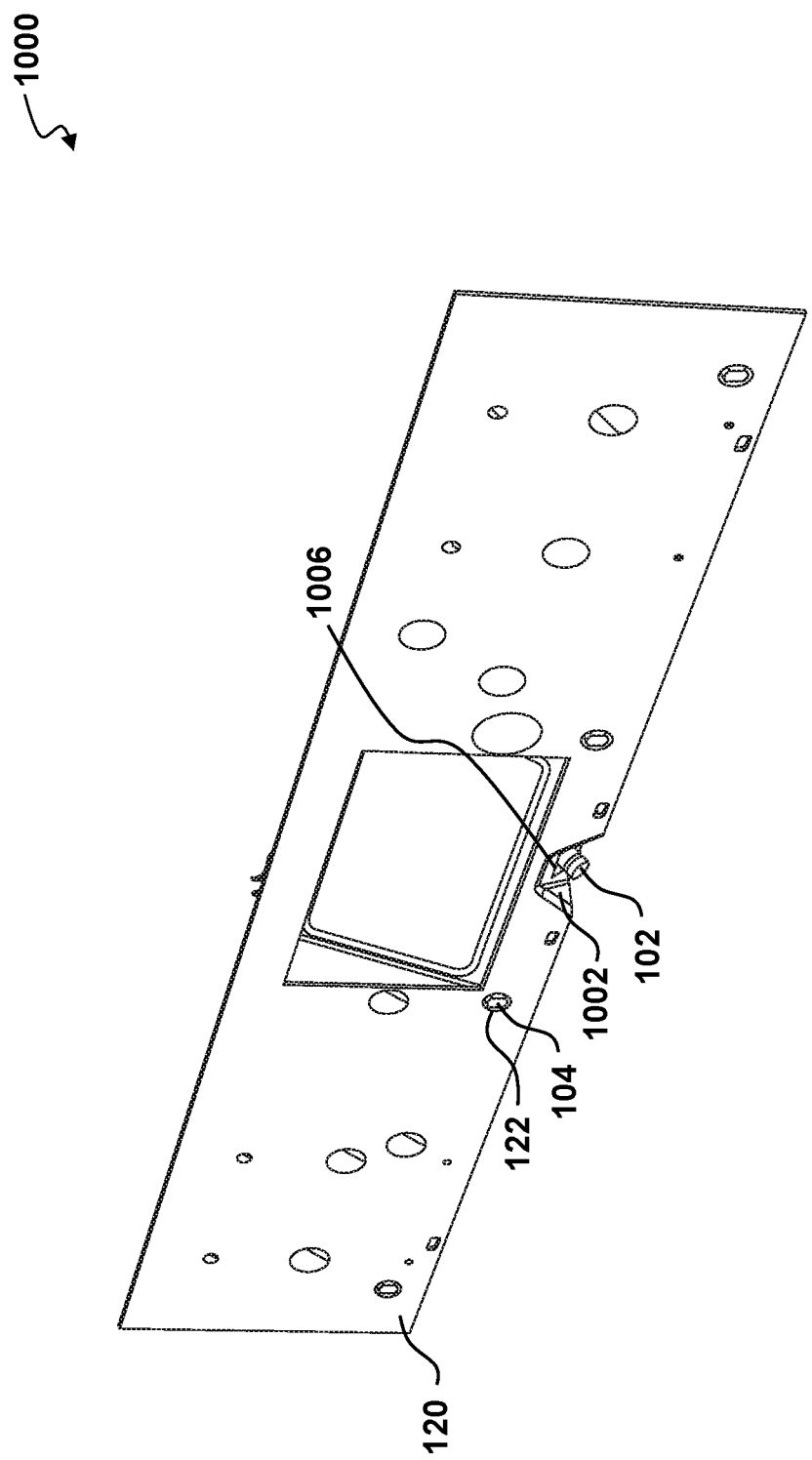

FIGS. 10A-10C depict front perspective, rear perspective, and rear perspective close-up views, respectively, of a camera 102 installed in an integral camera mount 1002 of a cover 120 and proximity sensors 104 installed on sensor mounts 1004 of a liftgate 1000, according to one embodiment. The integral camera mount 1002 may be formed as part of the cover 120. The integral camera mount 1002 may include a camera mount aperture 1006 to receive a portion of the camera 102. The sensor mounts 1004 may be attached to the cover 120 proximate an aperture 122 in the cover 120¬. The proximity sensor 104 may be attached to the proximity sensor mount 804 such that an end of the proximity sensor 104 is aligned with the aperture 122. The proximity sensor mount 1004 may be an L-shaped bracket disposed below the aperture 122 on the cover 120, according to one embodiment.

FIGS. 11A-11E depict a detachably attached camera housing 1100 and camera housing connector 1106, 1108 of a liftgate, according to one embodiment. The camera 102 may be connected to a detachable camera housing 1100. The detachable camera housing 1100 may have one or more connectors 1102, 1104 configured to fit one or more camera housing connectors 1106, 1108, such as via a snap fit. The connectors 1102, 1104 may be angled indentations configured to snap into corresponding apertures in the one or more camera housing connectors 1106, 1108, according to one embodiment. The housing 300 of the liftgate assembly may include a cut-out having the camera housing connectors 1106, 1108 disposed proximate the cut-out. Different detachably attached camera housings 1100 may be sized to accommodate various original equipment manufacturer (OEM) or after-market cameras 102.

FIGS. 12A-12D depict a camera 102 installed in a tab 1200 of a housing 300 of a liftgate, according to one embodiment. The housing 300 may have a first portion 1202, second portion 1204, and third portion 1206. The first portion 1202 may hold one or more components of the liftgate embodiment, such as a power unit, tank, power cable, hydraulic tubing, and the like.

The first portion 1202 may be substantially parallel with a ground level when the system is mounted to a vehicle, according to one embodiment. The first portion 1202 may include a tab 1200. The tab 1200 may be bent upward from the first portion 1202 at an acute angle. The camera 102 may be mounted in an aperture of the tab 1200. The angle of the tab 1200 relative to the first portion 1202 determines the angle of view of the camera 102, which may be fixed or adjustable according to different embodiments. In some embodiments, the angle of the tab 1200 may be adjusted 1208 to achieve a desired camera 102 field of view. For example, the angle may be decreased where the liftgate is mounted on a vehicle having a higher suspension and increased where the liftgate is mounted on a vehicle having a lower suspension to achieve similar fields of view. The angle of the tab 1200 may be adjusted 1208 by bending the tab 1200 relative to the housing 300. The tab 1200 may be pre-bent to a set angle such that only minor additional adjustments may be needed in most uses. In other embodiments, the tab 1200 may be substantially fixed in position. In some embodiments, the angle of the tab 1200 may be adjusted by a ratchet mechanism (not shown) or other adjustable mechanism.

The first portion 1202 may also include a lip portion 802. The lip portion 802 may be substantially perpendicular to the first portion 1202, according to one embodiment. The second portion 1204 of the housing 300 may be substantially perpendicular to the first portion 1202 and substantially parallel to the lip portion 802 according to one embodiment. The second portion 1204 may be distal from the lip portion 802 according to one embodiment. The third portion 1206 may be substantially perpendicular to the second portion 1204 and the lip portion 802 and substantially parallel to the first portion 1202. The third portion 1206 may be distal from the first portion 1202.

FIGS. 13A-13D depict bottom perspective, top perspective, front, and cross-section views, respectively, of an angled tab 1200 of a housing 300 of a liftgate, according to one embodiment. FIG. 13D depicts a side cross-section view of the housing 300 of FIG. 13C about line B-B. The angled tab 1200 may be formed as part of the housing 300. A first wall 1300 and a second wall 1302 may be attached to the housing 300. The walls 1300, 1302 form a barrier along with the angled tab 1200 to prevent debris or other materials from entering into the housing 300, according to one embodiment. The walls 1300, 1302 may be sized to allow various angled tab 1200 angles, such as 35-45 degrees, relative to the first portion 1202 of the housing 300 while maintaining this barrier, according to one embodiment. The tab 1200 angle may be adjusted 1208 from parallel to the first portion to perpendicular to the first portion 1202. One or more proximity sensor mounts 1304 may be used to attach one or more proximity sensors.

The third portion of the housing 300 may be attached to an upper plate 1306, according to one embodiment. The upper plate 1306 may be attached to an L-shaped channel 1308. A cover, such as shown in FIG. 1, may be attached to the lip portion 802, upper plate 1306, and/or L-shaped channel 1308. The cover may also prevent debris or other materials from entering into the housing 300, which may contain a camera, proximity sensors, and the like.

Figure 14B:
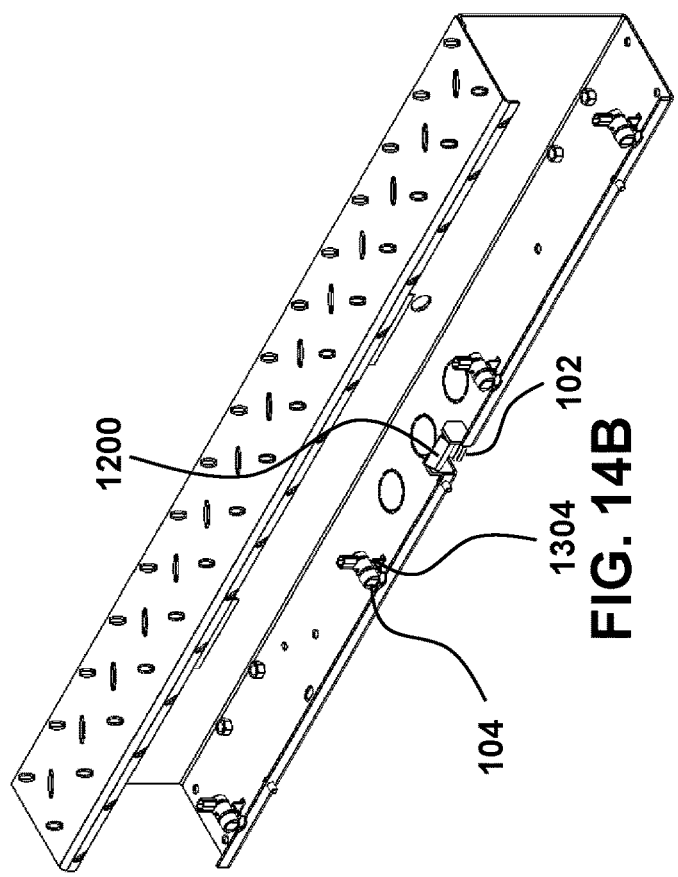
FIG. 14B depicts a top perspective view of the liftgate embodiment of FIG. 13A with the camera and proximity sensors installed in the housing.
Figure 14A:
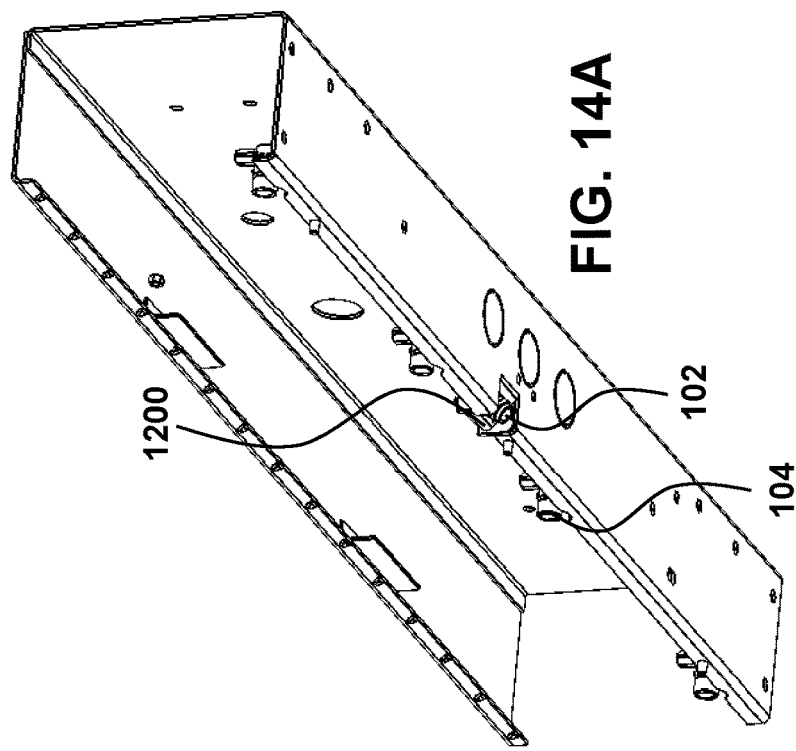
FIG. 14A depicts a bottom perspective view of the liftgate embodiment of FIG. 13A with a camera and proximity sensors installed in the housing.
Figure 14C:
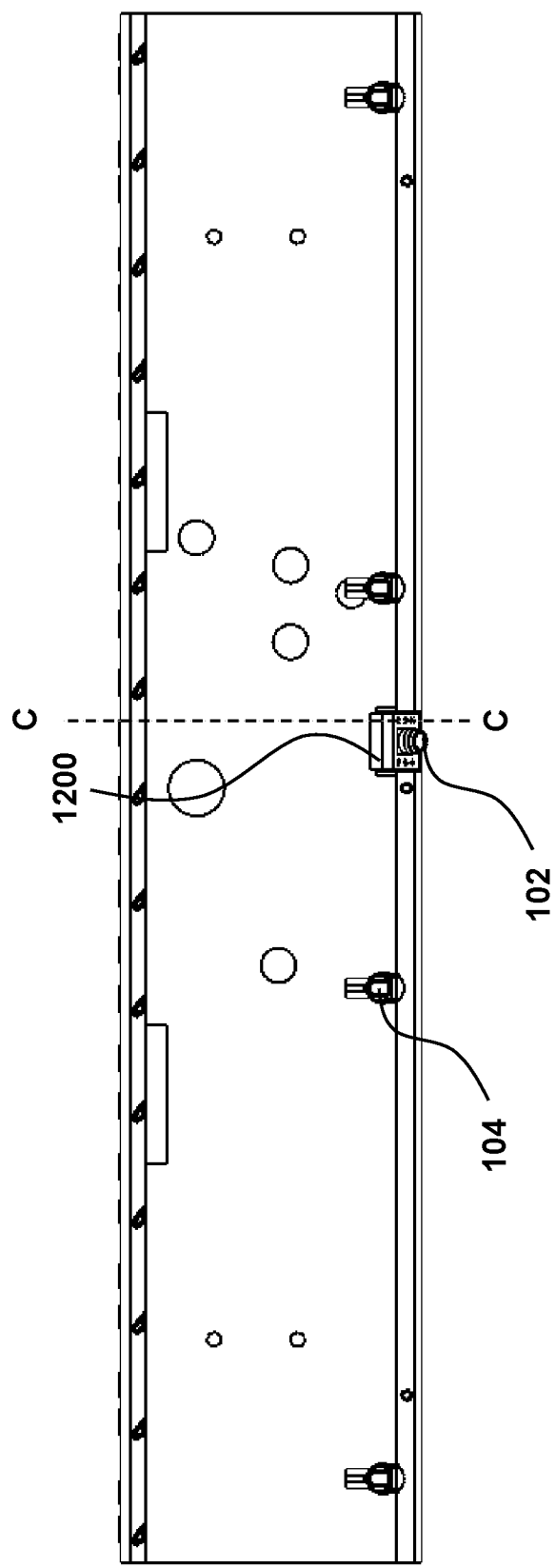
FIG. 14C depicts a front view of the liftgate embodiment of FIG. 13A with the camera and proximity sensors installed in the housing.

FIG. 14A depicts a bottom perspective view of the liftgate embodiment of FIG. 13A with a camera 102 and proximity sensors 104 installed in the housing. FIG. 14B depicts a top perspective view of the liftgate embodiment of FIG. 13A with the camera 102 and proximity sensors 104 installed in the housing. FIG. 14C depicts a front view of the liftgate embodiment of FIG. 13A with the camera 102 and proximity sensors 104 installed in the housing. The camera 102 is installed in the angled tab 1200. The one or more proximity sensors 104 are installed on one or more proximity sensor mounts 1304.

Figure 14D:
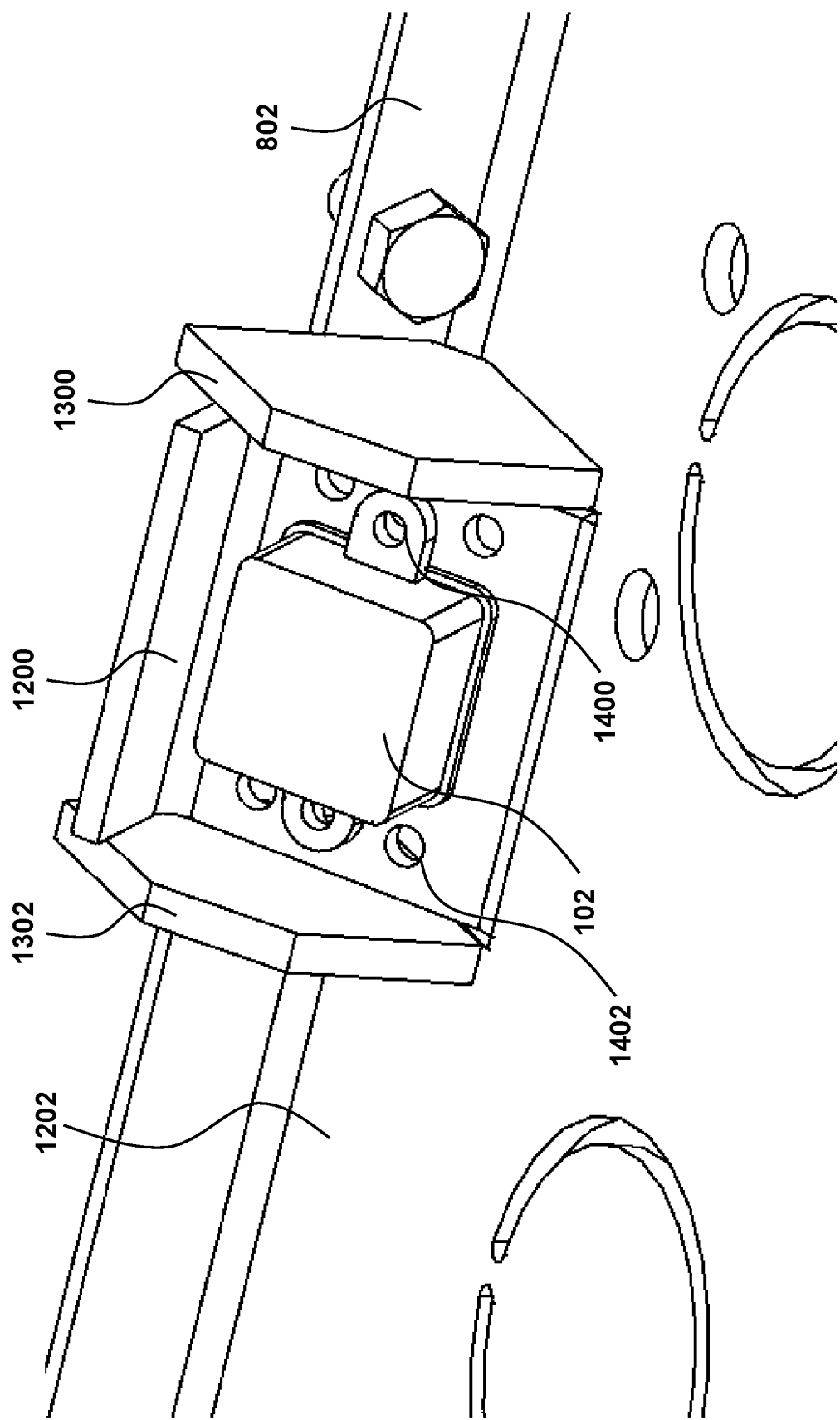
FIG. 14D depicts a close-up perspective view of the liftgate embodiment of FIG. 13A with the camera installed in the housing.
Figure 14E:
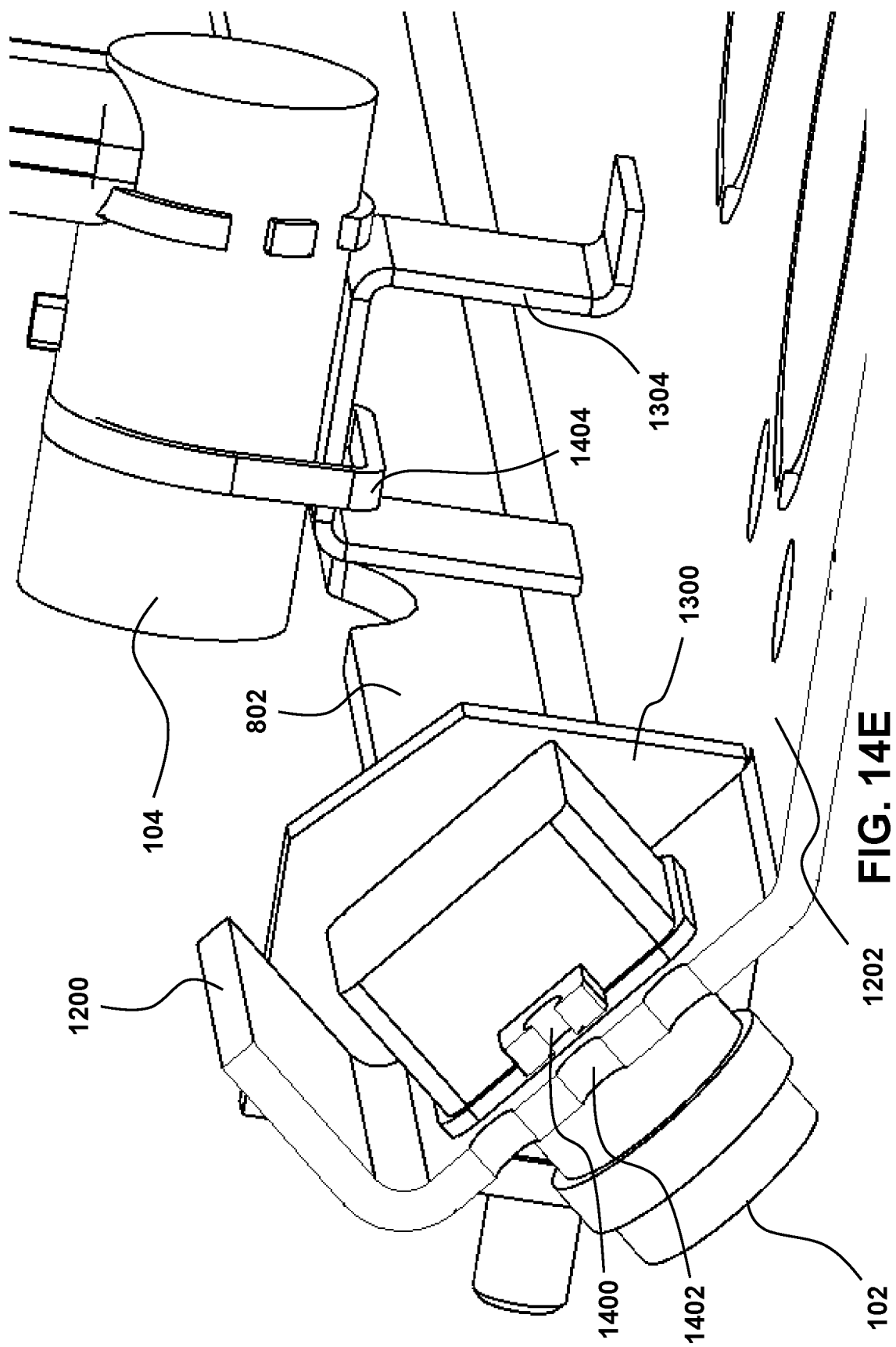
FIG. 14E depicts a perspective cross-section view of the liftgate embodiment of FIG. 13C about line C-C with the camera and proximity sensors installed in the housing.

FIG. 14D depicts a close-up perspective view of the liftgate embodiment of FIG. 13A with the camera 102 installed in the housing. FIG. 14E depicts a perspective cross-section view of the liftgate embodiment of FIG. 13C about line C-C with the camera 102 and proximity sensors 104 installed in the housing. FIG. 14F depicts a close-up bottom perspective view of the liftgate embodiment of FIG. 13A with the camera 102 installed in the housing. The camera 102 may include one or more apertures 1400 for mounting the camera 102. The angled tab 1200 may include one or more corresponding apertures 1402 for connecting the camera 102 to the angled tab. A connector, such as a nut and bolt, or screw, may be inserted through the corresponding apertures 1400, 1402 to attach the camera 102 to the angled tab 1200. In some embodiments, the angled tab 1200 may have a plurality of apertures 1402 to adjust the position of the camera 102 or to accommodate various camera 102 mounts.

Figure 14G:
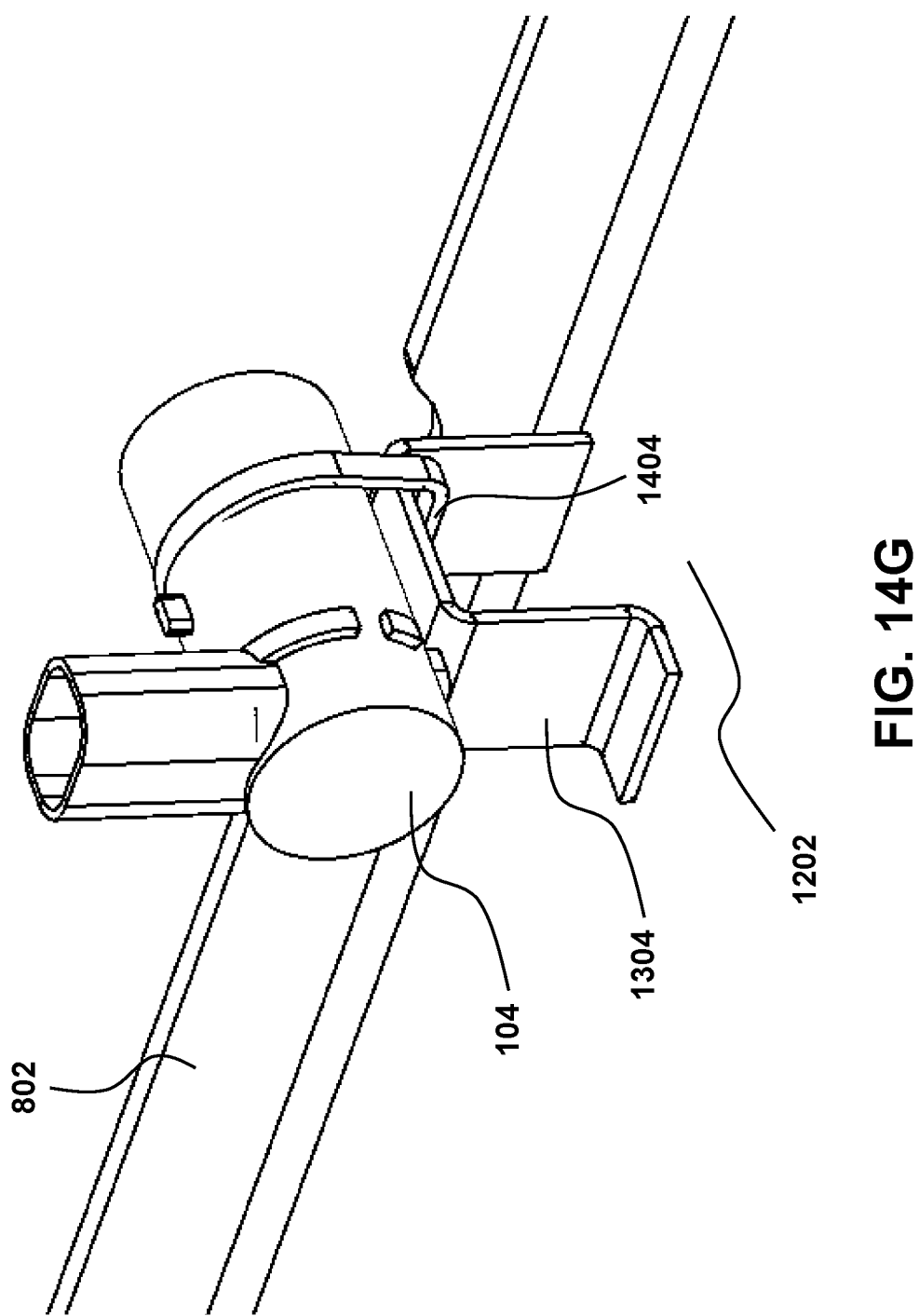
FIG. 14G depicts a close-up perspective view of the liftgate embodiment of FIG. 13A with the proximity sensor installed in the housing.

FIG. 14G depicts a close-up perspective view of the liftgate embodiment of FIG. 13A with the proximity sensor installed in the housing. The proximity sensor 104 may be disposed on top of the proximity sensor mount 1304. A connector 1404, such as a cable tie, may be used to hold the proximity sensor 104 to the proximity sensor mount 1304. The connector 1404 may go about an outer diameter of the proximity sensor 104 and through an opening in the proximity sensor mount 1304 created between the proximity sensor mount 1304 and the first portion 1202 of the housing.

Figure 15A:
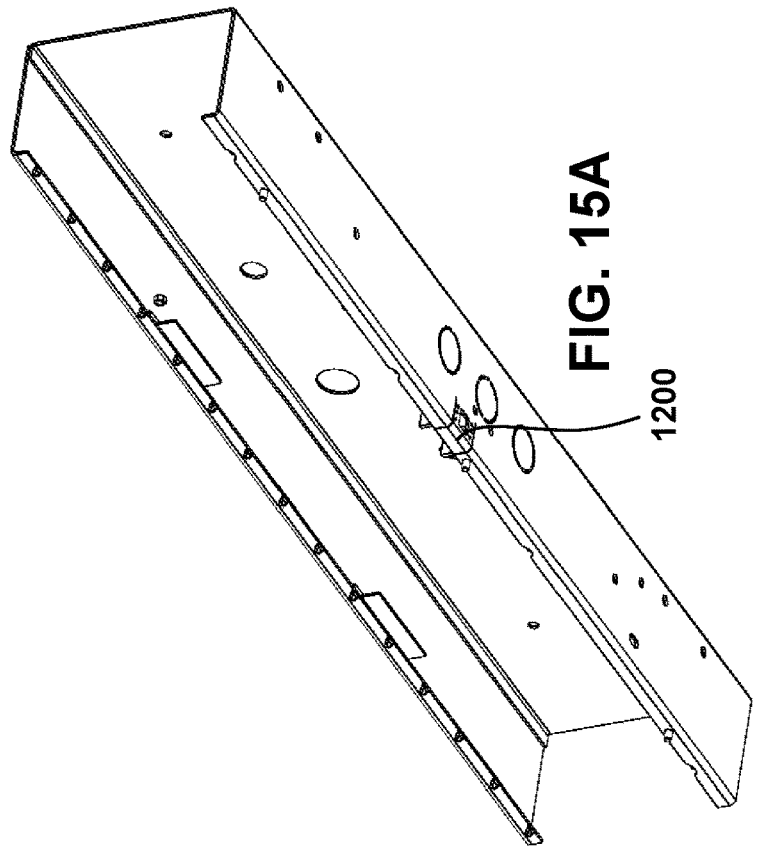
FIG. 15A depicts a bottom perspective view of the liftgate embodiment of FIG. 13A with the tab of the housing in a first position.
Figure 15B:
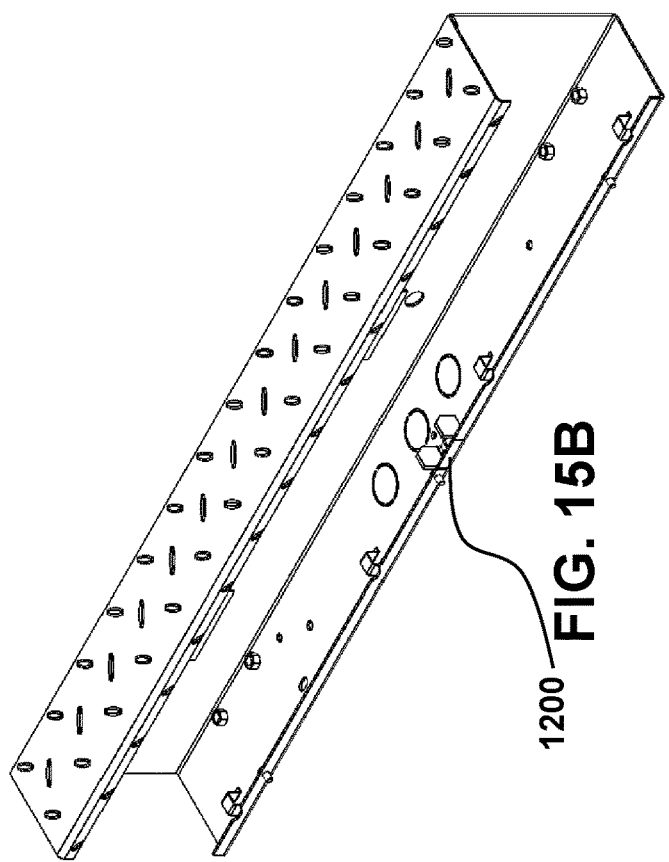
FIG. 15B depicts a top perspective view of the liftgate embodiment of FIG. 13A with the tab of the housing in the first position.
Figure 15D:
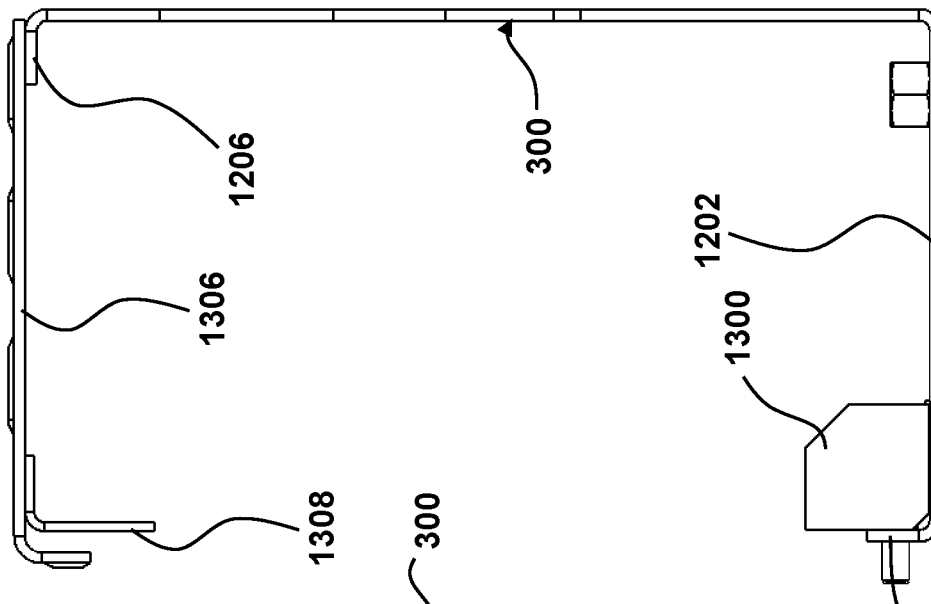
FIG. 15D depicts a side cross-sectional view of the liftgate embodiment of FIG. 15C about line D-D.
Figure 15C:
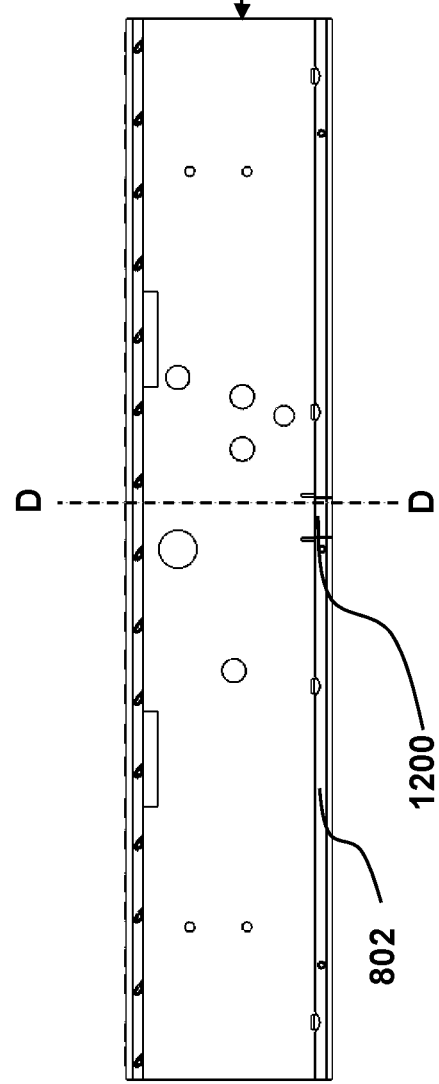
FIG. 15C depicts a front view of the liftgate embodiment of FIG. 13A with the tab of the housing in the first position.
Figure 15E:
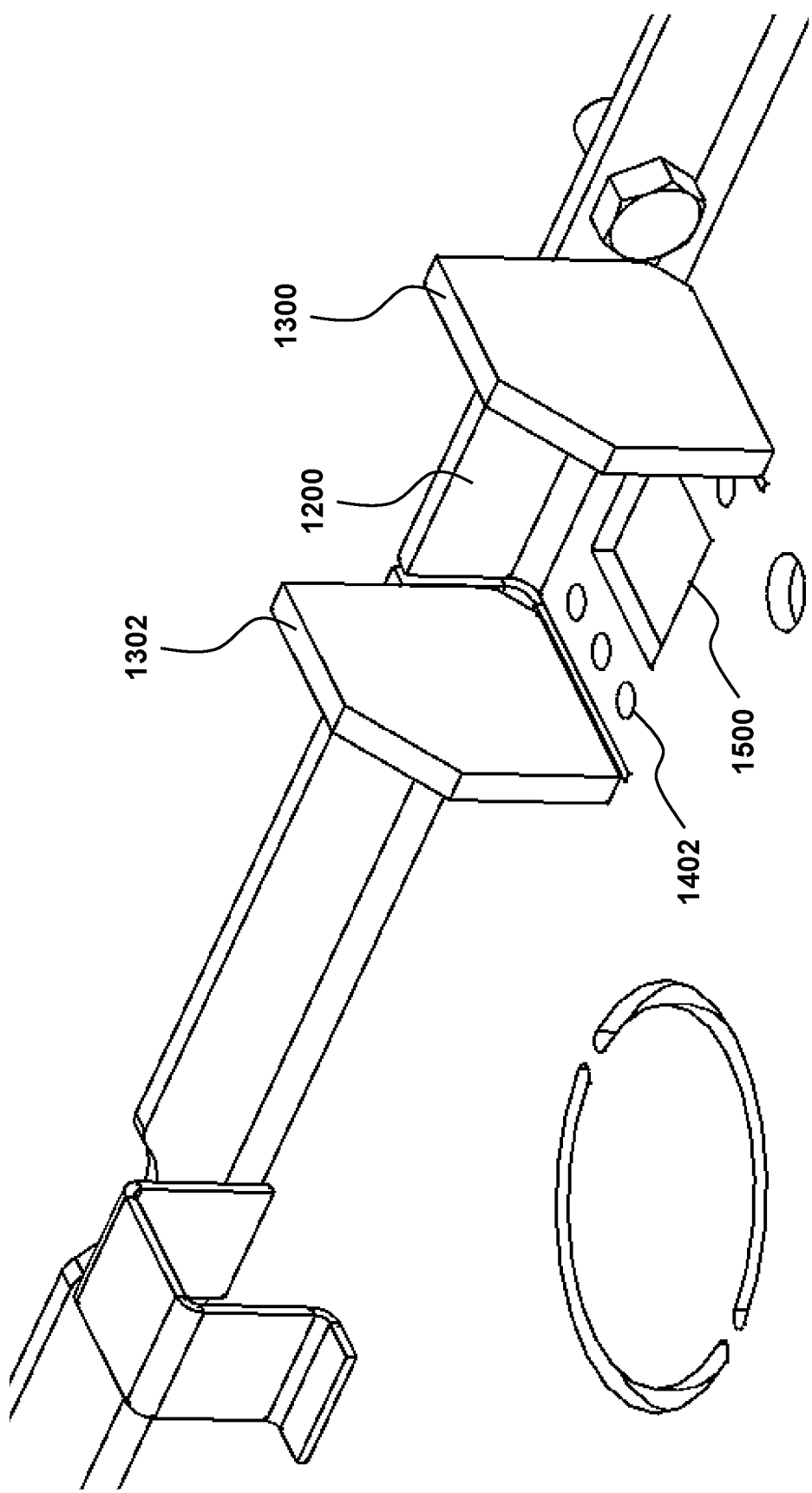
FIG. 15E depicts a close-up perspective view of the liftgate embodiment of FIG. 13A with the tab of the housing in the first position.

FIG. 15A depicts a bottom perspective view of the liftgate embodiment of FIG. 13A with the tab 1200 of the housing 300 in a first position. FIG. 15B depicts a top perspective view of the liftgate embodiment of FIG. 13A with the tab 1200 of the housing 300 in the first position. FIG. 15C depicts a front view of the liftgate embodiment of FIG. 13A with the tab 1200 of the housing 300 in the first position. FIG. 15D depicts a side cross-sectional view of the liftgate embodiment of FIG. 15C about line D-D. FIG. 15E depicts a close-up perspective view of the liftgate embodiment of FIG. 13A with the tab 1200 of the housing 300 in the first position. The tab 1200 of the housing 300 may be in a first, unbent, position. The tab 1200 may then be angled relative to the first portion 1202 of the housing 300 to a second position at a desired angled to achieve a desired camera field of view, as shown in FIG. 14A. The tab 1200 includes a tab aperture 1500 for receiving at least a portion of a camera, as shown in FIG. 14A.

As those skilled in the art will recognize, the components and modules used in certain embodiments disclosed herein can be made from rigid and semi-rigid materials. The components and modules used in certain embodiments disclosed herein can be made from metals such as iron, aluminum, metal alloys. The components and modules used in certain embodiments disclosed herein can be made from metals such as iron, aluminum, metal alloys. The components and modules used in certain embodiments disclosed herein can be made from rigid and semi-rigid plastics.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:
1. A system comprising:
a liftgate housing;

a camera mount disposed in the liftgate housing for receiving at least a portion of a camera, wherein the camera mount comprises a bendable tab, and wherein the bendable tab is adjustable from parallel to a first portion of the liftgate housing to an acute angle relative to the first portion of the liftgate housing; and a camera mount aperture disposed in the camera mount, wherein the camera mount is configured to align the camera with the camera mount aperture.

2. The system of claim 1, wherein the first portion of the liftgate housing is substantially parallel with a ground level when the system is mounted to a vehicle.

3. The system of claim 1, wherein the bendable tab is pre-bent to a set angle.

4. The system of claim 1, wherein the first portion of the liftgate housing comprises a lip portion, and wherein the lip portion is substantially perpendicular to the first portion of the liftgate housing.

5. The system of claim 1, wherein the liftgate housing further comprises:
a second portion of the liftgate housing, wherein the second portion of the liftgate housing is substantially perpendicular to the first portion of the liftgate housing and substantially parallel to the lip portion, and wherein the second portion of the liftgate housing is distal from the lip portion; and
a third portion of the liftgate housing, wherein the third portion of the liftgate housing is substantially perpendicular to the second portion of the liftgate housing and the lip portion and substantially parallel to the first portion of the liftgate housing, wherein the third portion of the liftgate housing is distal from the first portion of the liftgate housing.

6. The system of claim 1, further comprising one or more walls, wherein the one or more walls and the bendable tab form a barrier configured to prevent debris from entering into the liftgate housing.

7. The system of claim 1 further comprising:
one or more proximity sensors disposed in the liftgate housing.

8. The system of claim 1 wherein the first portion is substantially parallel with a ground level when the liftgate housing is mounted to a vehicle.

9. The system of claim 1 wherein movement of the bendable tab relative to the first portion of the liftgate housing adjusts a field of view of the camera.

10. The system of claim 1 further comprising:
a first wall attached to the liftgate housing; and
a second wall attached to the liftgate housing;
wherein the first wall and the second wall are disposed proximate the bendable tab to form a barrier to prevent debris from entering into the liftgate housing, wherein the first wall and the second wall are substantially perpendicular to the first portion of the liftgate housing, and wherein the first wall and the second wall are substantially perpendicular to the bendable tab.

11. The system of claim 1 further comprising:
one or more proximity sensors disposed in the liftgate housing;
one or more proximity sensor mounts disposed in the liftgate housing; and
one or more connectors;
wherein each of the one or more connectors are disposed about an outer diameter of each of the one or more proximity sensors and through an opening in each of the one or more proximity sensor mounts created between each of the one or more proximity sensor mounts and the first portion of the liftgate housing.

12. A system, comprising:
a bendable tab, wherein the bendable tab is adjustable from a first position to a second position, wherein the bendable tab is parallel to a first portion of a liftgate housing in the first position, and wherein the bendable tab is at an acute angle relative to the first portion of the liftgate housing in the second position;
a first wall attached to the first portion of the liftgate housing; and
a second wall attached to the first portion of the liftgate housing;
wherein the first wall and the second wall are disposed proximate the bendable tab to form a barrier to prevent debris from entering into the liftgate housing.

13. The system of claim 12 wherein the bendable tab is formed as part of the liftgate housing.

14. The system of claim 12 wherein the first wall and the second wall are substantially perpendicular to the first portion of the liftgate housing.

15. The system of claim 14 wherein the first wall and the second wall are substantially perpendicular to the bendable tab.

16. The system of claim 12 further comprising:
a camera; and
a tab aperture for receiving at least a portion of the camera disposed in the bendable tab, wherein movement of the bendable tab relative to the first portion of the liftgate housing adjusts a field of view of the camera.

* * * * *